(12) United States Patent
Paulsohn et al.

(10) Patent No.: US 12,414,573 B2
(45) Date of Patent: Sep. 16, 2025

(54) APPARATUSES AND METHODS FOR AUTOMATEDLY SADDLING BEHEADED AND EVISCERATED FISH ON HOLDING APPARATUSES FOR AUTOMATED FURTHER PROCESSING AND FOR AUTOMATEDLY OBTAINING MEAT FROM BEHEADED AND EVISCERATED FISH

(71) Applicant: NORDISCHER MASCHINENBAU RUD. BAADER GMBH + CO. KG, Lübeck (DE)

(72) Inventors: Carsten Paulsohn, Lübeck (DE); Roland Pein, Lübeck (DE); Arne Pfuhl, Lübeck (DE); Simon Reincke, Lübeck (DE); Thomas Russ, Lübeck (DE); Felix Strangmann, Lübeck (DE)

(73) Assignee: Nordischer Maschinenbau Rud. Baader GmbH & Co. KG, Lübeck (DE)

( * ) Notice: Subject to any disclaimer, the term of this patent is extended or adjusted under 35 U.S.C. 154(b) by 92 days.

(21) Appl. No.: 18/258,032

(22) PCT Filed: Dec. 18, 2020

(86) PCT No.: PCT/EP2020/086959
§ 371 (c)(1),
(2) Date: Jun. 16, 2023

(87) PCT Pub. No.: WO2022/128119
PCT Pub. Date: Jun. 23, 2022

(65) Prior Publication Data
US 2024/0049734 A1    Feb. 15, 2024

(51) Int. Cl.
A22C 25/08    (2006.01)
A22C 25/12    (2006.01)
A22C 25/14    (2006.01)

(52) U.S. Cl.
CPC ............... *A22C 25/08* (2013.01); *A22C 25/12* (2013.01); *A22C 25/14* (2013.01)

(58) Field of Classification Search
CPC ......... A22C 25/00; A22C 25/08; A22C 25/12; A22C 25/14
(Continued)

(56) References Cited

U.S. PATENT DOCUMENTS 5,413,525 A     5/1995   Braeger et al.
6,322,437 B1 *  11/2001  Grabau ................. A22C 25/16
                                             452/161
(Continued)

FOREIGN PATENT DOCUMENTS

CN      109475133 A     3/2019
CN      110996657 A     4/2020
(Continued)

*Primary Examiner* — David J Parsley
(74) *Attorney, Agent, or Firm* — Dinsmore & Shohl LLP

(57) ABSTRACT

An apparatus for saddling fish on holding apparatuses for further processing comprises: a frame structure; a transport device on the frame structure, for transporting fish tail first and abdominal cavity downwards in a direction T along a transport path, wherein the transport device comprises: a transport unit that is driven rotatingly, and a holding apparatus on the transport unit comprising a fastening element and a holding plate for holding the fish during processing; a feed device for feeding the fish into a region of the transport device; a catching and centring device to catch and centre the fish parallel to the transport direction T; and a take-over device for taking the fish from the catching and centring device, holding the fish, and releasing the fish as soon as a holding apparatus transported through the fish captures the fish and pulls them from the take-over device.

34 Claims, 11 Drawing Sheets

(58) Field of Classification Search
USPC .......................................... 452/177, 182, 183
See application file for complete search history.

(56) References Cited

U.S. PATENT DOCUMENTS

| | | | |
|---|---|---|---|
| 8,986,077 B1 * | 3/2015 | Ryan .................... | A22C 25/145 |
| | | | 452/57 |
| 10,051,872 B2 | 8/2018 | Finke et al. | |
| 2002/0022446 A1 | 2/2002 | Scherch et al. | |
| 2018/0160692 A1 | 6/2018 | Paulsohn | |
| 2019/0037865 A1 | 2/2019 | Pettersen et al. | |

FOREIGN PATENT DOCUMENTS

| | | |
|---|---|---|
| DE | 2939625 A1 | 4/1981 |
| DE | 4318810 A1 | 12/1994 |
| DE | 19522238 A1 | 1/1997 |
| DE | 102010022056 A1 | 12/2011 |
| EP | 2958434 A1 | 12/2015 |
| WO | 9907229 A1 | 2/1999 |
| WO | 03013262 A1 | 2/2003 |
| WO | 2016169767 A1 | 10/2016 |

* cited by examiner

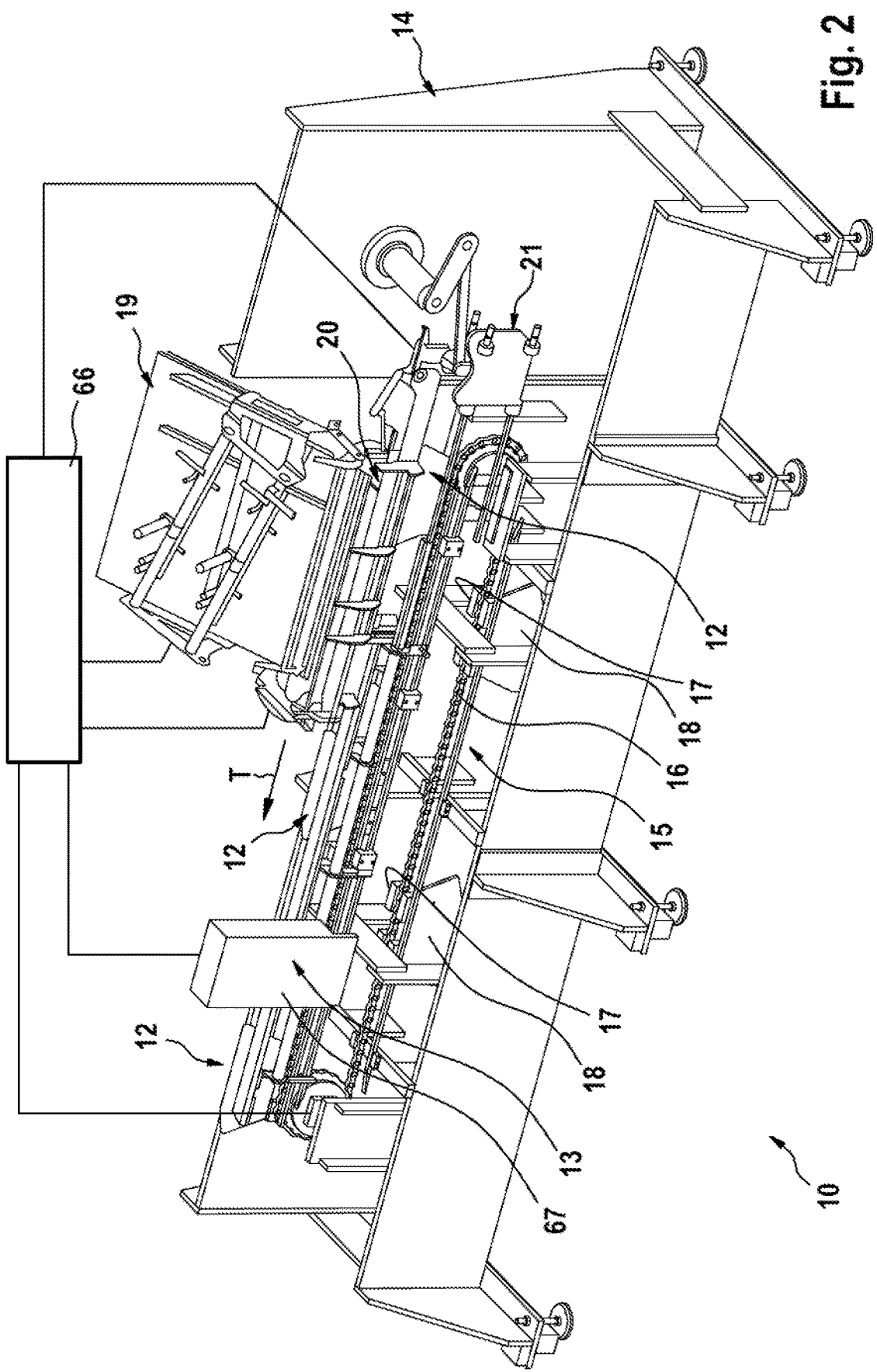

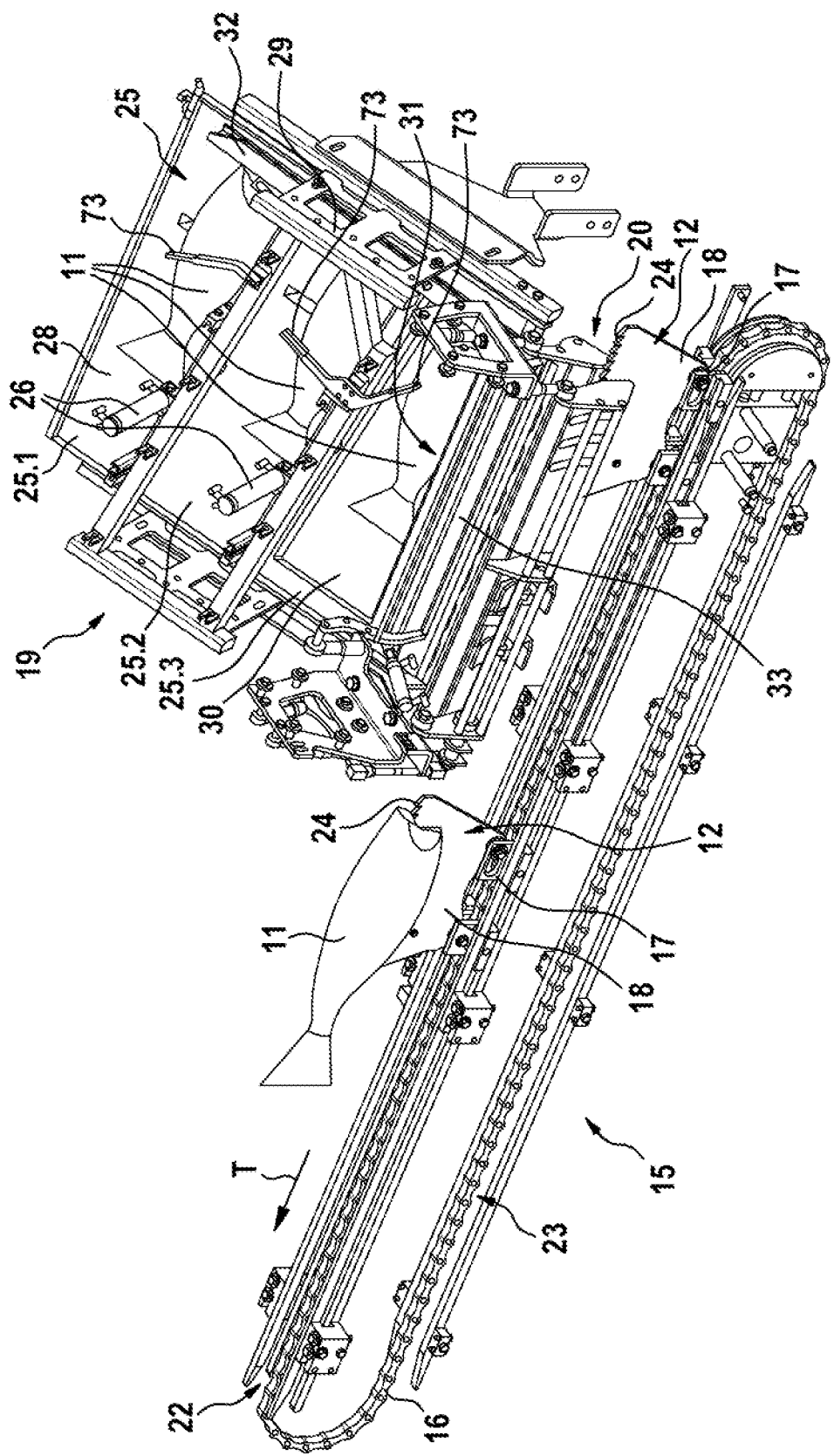

APPARATUSES AND METHODS FOR AUTOMATEDLY SADDLING BEHEADED AND EVISCERATED FISH ON HOLDING APPARATUSES FOR AUTOMATED FURTHER PROCESSING AND FOR AUTOMATEDLY OBTAINING MEAT FROM BEHEADED AND EVISCERATED FISH

CROSS-REFERENCE TO RELATED APPLICATIONS

This application is the U.S. National Stage of PCT/EP2020/086959 filed on Dec. 18, 2020, the entire content is incorporated herein by reference in its entirety.

FIELD OF THE INVENTION

The invention relates to an apparatus, configured and adapted for automatedly saddling beheaded and eviscerated fish on holding apparatuses for automated further processing of the beheaded and eviscerated fish at a downstream processing station.

The invention further relates to an apparatus for automatedly obtaining meat from beheaded and eviscerated fish, comprising a transport device for transporting the beheaded and eviscerated fish tail first and abdominal cavity downwards in transport direction T along a transport path and at least one processing station for automatedly processing the beheaded and eviscerated fish.

The invention also relates to a method for automatedly saddling beheaded and eviscerated fish on holding apparatuses of a transport device for further processing in an apparatus for automatedly obtaining meat.

The invention further relates to a method for automatedly obtaining meat from beheaded and eviscerated fish, comprising the steps: saddling beheaded and eviscerated fish with the abdominal cavity downwards on holding apparatuses of a transport device, transporting the beheaded and eviscerated fish by means of a transport device comprising at least one holding apparatus along a transport path tail first in transport direction T, separating the meat from the bone structure of the beheaded and eviscerated fish by means of a processing station arranged along the transport path.

BACKGROUND OF THE INVENTION

Such apparatuses and methods are used within the fish processing industry. In principle a high degree of automation is desirable during fish processing in order to keep the load placed on operating personnel as low as possible and to optimise the efficiency of the apparatuses and methods. Automation further leads to improved and reproducible production results. Prior art does however place restrictions on such automation. Irrespective of the processing station, and in particular when filleting beheaded and eviscerated fish, the saddling of the beheaded and eviscerated fish on holding apparatuses that are driven rotatingly is currently carried out manually. In other words, operating personnel is required at every apparatus for automatedly obtaining meat from beheaded and eviscerated fish and at every apparatus with which beheaded and eviscerated fish is processed, who will manually position the beheaded and eviscerated fish with the opened abdominal cavity side downwards, tail first in transport direction T of the transport device individually on the holding apparatuses of the transport device that is driven rotatingly. The fish is transported into the region of the apparatus or stored near the same for this. The operator picks up the fish, weighing several kilograms, and positions these-depending on the experience of the operator-more or less centrally on the holding apparatus. This leads to a deterioration of the occupation efficiency of the holding apparatuses and therefore to a reduction in performance with regard to precision and performance of the respective processing stations. Current machine performance provides for each operator to saddle approx. 15 to 20 fish per minute, which constitutes an enormous physical load and affects the precise positioning of the fish on the holding apparatuses.

The invention is therefore based on the problem of providing a simple and reliable apparatus that will simplify and improve the saddling of beheaded and eviscerated fish on holding apparatuses. The problem further consists of suggesting a corresponding method. The problem also consists of suggesting correspondingly improved apparatuses and methods for automatedly obtaining meat from beheaded and eviscerated fish.

SUMMARY OF THE INVENTION

This problem is solved by the apparatus mentioned hereinbefore in that the said apparatus is characterised by a frame structure, a transport device arranged on the frame structure, configured and adapted for transporting beheaded and eviscerated fish tail first and abdominal cavity downwards in transport direction T along a transport path, wherein the transport device comprises a transport unit that is driven rotatingly and at least one holding apparatus, comprising at least one fastening element device fitted to the same, and a holding plate, which is configured and adapted for holding the beheaded and eviscerated fish during its processing, a feed device, configured and adapted for automatedly feeding the beheaded and eviscerated fish to the region of the transport apparatus, a catching and centring device, configured and adapted to pick up the beheaded and eviscerated fish released by the feed device with the abdominal cavity facing downwards, and centring the same parallel to transport direction T, and a take-over device, configured and adapted for taking over the beheaded and eviscerated fish from the catching and centring device, for holding the beheaded and eviscerated fish in a transfer position, and for releasing the beheaded and eviscerated fish as soon as a holding apparatus transported through the beheaded eviscerated fish in the region of the abdominal cavity of the beheaded and eviscerated fish captures the same and pulls it off in the transfer position from the take-over device. The provision of an automated saddling module that reduces the use of operators in the region of saddling, and therefore costs, guarantees an operator-independent saddling of the fish on the holding apparatuses in a precise and reproducible way, which is of particular advantage against the background of fish being a natural product subject to varying seasonal, storage and nutritional dimensions and/or consistencies and suchlike. The feed device ensures that the fish can be transported into the region of the transport device in an automated way at all, namely directly to the transport device, which means that the fish is transported directly to the region of the transport device. The catching and centring unit guarantees a centring and holding of the fish, and thus an optimised positioning of the fish, in order to be able to position the same aligned in their final (processing) position on the holding apparatus. This positioning is supported by the take-over device in that the fish is brought into a transfer position for automated saddling, from which the holding apparatus can pick up the fish and transport it further, preferably to a processing station. Every fish is then automatically brought into an optimal position and aligned by the apparatus according to the invention, from which the holding apparatuses can take over and pick up the fish without any intervention by the operator reliably and with good performance. The holding apparatuses, which can have various shapes and configurations, but are preferably configured and adapted as a kind of transport saddle, are repeatedly passed back to the region of the transfer position during their rotation, in which the fish are positioned quasi ready for picking up. This guarantees a precise and reproducible saddling without use of operators, which can increase the efficiency and precision of subsequent processing.

The feed device preferably comprises a cascade-like receptacle for receiving at least two beheaded and eviscerated fish, wherein receiving sections of the receptacle formed for receiving individual beheaded and eviscerated fish can be opened and closed separately from each other by means of flap elements with the aid of actuating means. At least three receptacle sections are preferably provided, wherein the number of receptacle sections can also be selected differently, in particular greater. Such feed devices, unknown in connection with an automated saddling module, preferably comprise a base body and a flap system, which includes traverse flap elements pivotably arranged on the same. The base body can be an inclined base plate, on which fish, held and released by the individual flap elements, independently, namely purely with the aid of gravity, slide in the direction of the catching and centring unit. This ensures a particularly simple but nevertheless efficient feed of the fish into the region of the transport device. In other embodiments the base body can also be a driven conveyor belt or suchlike. The feed can finally also be realised with a simple chute, down which the fish can slide stomach downwards, tail first in transport direction T. A closable opening can optionally be configured in the base body for separating out individual fish, for example as a closable floor flap in the base plate, which can be opened and closed once more with actuating means. The cascade-like receptacle ensures that fish of the correct size, the correct alignment and in a defined position are always provided in the output position, which can travel via the catching and centring device and the take-over device to the holding apparatuses.

A preferred further development is characterised in that the flap elements are configured and adapted substantially transverse to their longitudinal expansion from receiving section to receiving section up to the region of an output position to the catching and centring device in a controllable way for an individual and clocked output of the beheaded and eviscerated fish. This creates the possibility of always being able to provide a fish ready for saddling in the output position in order to guarantee continuous and efficient saddling. A different, preferably individual feed or onward transport of fish can also include clocking means in place of controlled flap elements.

The fish preferably lie slightly diagonal in the individual receptacle sections, e.g. initially not parallel to transport direction T of the transport device, so that the fish reaches its final position, preferably parallel to transport direction T of the transport device, only in the direct output position. The diagonal position can for example be realised in that the flap elements are aligned and arranged diagonal to the base body. The diagonal position allows the fish to slide into a defined final position in the respective receptacle sections in the region of the (removed) head. In other words, the fish are moved or slide against a shoulder with their head side due to the incline of the base body and the flap elements positioned diagonally in relation to the same, which allow calculation of the geometry of the fish and in particular also the position of the abdominal cavity for further process steps, as the fish all lie in a comparable position. Conclusions regarding the size and position of the abdominal cavity can be drawn with the aid of the defined head end position thanks to the known anatomy of the fish, which allow the control and/or regulation of individual actuating means for optimal saddling precision and simplification.

In a preferred further development of the invention the feed device comprises detection means at least for detecting the ventral/dorsal position and/or the tail/head position and/or the height or thickness of the beheaded and eviscerated fish. This ensures a precise and reproducible feed of fish in the output position. Alternatively, fish in an incorrect position, for example back first, and/or fish not suitable for processing due to their size can automatically be separated out prior to saddling by means of a suitable control and/or regulation device. The decision regarding the separating out can therefore be made in dependence on the position (ventral/dorsal and/or tail/head and/or thickness or height) prior to saddling in order to guarantee an efficient saddling process and an efficient saddling occupancy.

An individual detection means can optionally be provided. Several detection means can also be used. The or each detection means, which is preferably connected with a control and/or regulation device and irrespectively of whether it is configured and adapted mechanically, optically or in combination with each other, is preferably arranged on the feed device on the input side. Other or additional positions for the detection means are however also possible. Each receptacle section can therefore lastly be monitored by means of a detection element, in particular also whether a fish is located in the receptacle section at all.

A reliable, reproducible and precise feed of fish to be processed to the region of the catching and centring device can thus be ensured particularly easily with the advantageous embodiments of the feed device described above, namely with high performance and position accuracy. Optionally the fish can also be automatically brought directly into the output position individually with other handling devices, robot units or suchlike as a feed device. An individual manual feed of the fish into the output position is lastly also feasible.

The catching and centring device is advantageously arranged below the feed device in the region of an output position of the same in such a way that the beheaded and eviscerated fish can be moved from the feed device with the abdominal cavity first, tail in transport direction T of the transport device first in the catching and centring device. This arrangement will let the fish quasi simply fall/slide downwards, which guarantees a simple and effective, but nevertheless automatic transfer of the fish from the feed device to the catching and centring device for preparing the take-over of fish by means of the holding apparatus.

An advantageous further development is characterised in that at least one release flap is arranged in the region of the output position during the transition from the feed device to the catching and centring device, which is allocated to the feed device and/or the catching and centring device. The release plate, which is for example separate and preferably adapted to the flap elements of the feed device, enables the precise clocking of the fish to be saddled, in particular adapted to the transport speed of the transport device, in the catching and centring device. A control and/or regulation device is advantageously provided for this. The release plate is preferably aligned parallel to transport direction T of the transport device, so that the fish lies in a defined position directly prior to the automated transfer to the catching and centring device, namely with the head side against the shoulder, abdominal cavity downwards, tail first and parallel to transport direction T of the transport device. This ensures the precise and reproducible positioning of the fish directly prior to the transfer of the same to the catching and centring device.

The catching and centring device advantageously comprises a support body arranged on the frame structure, which includes a holding and centring means and a tail clamp means. The support body, for example a traverse or suchlike, is preferably permanently positioned on the frame structure and fitted to the same. The holding and centring means is preferably configured and adapted for centring the fish to be saddled with the middle of the fish on the (subsequent) processing middle, e.g. on the middle of the holding plate of the holding apparatus of the transport device, in order to pre-position the fish in an optimal saddling position.

The holding and centring means comprises at least two centring rails arranged at a distance from each other and substantially aligned parallel to transport direction T of the transport device for this in an expedient further development, for forming a centring shaft, wherein the centring rails are configured and adapted to move towards and away from each other to change the distance. In principle the centring rails are configured and adapted to set the distance to a defined size range of the fish to be saddled prior to commissioning the apparatus. A distance regulation during the saddling process, and thus quasi online, is optionally also possible. Other centring means can however also be used in place of the centring rails. Two rigid centring rails, rods or suchlike fixed at a distance from each other can also be used as holding and centring means in further variants.

The centring rails, or at any rate sections of the same, are for example configured and adapted linearly moveable, preferably transverse to transport direction T of the transport device, towards and away from each other. Particularly preferably the centring rails are mounted on the support body to pivot around pivot axes $S_{Z1}$ and $S_{Z2}$, which are aligned parallel to transport direction T of the transport device. Particularly advantageously a stepless setting of the size of the distance between the centring rails is guaranteed, wherein the or each centring rail can be set in any position. The configuration, shaping and suchlike of the centring rails can vary. Each centring rail can be configured as a single or multiple part. The two centring rails can be aligned consistently parallel to each other. The centring rails preferably diverge at any rate in some sections, and particularly preferably at the output side end of the catching and centring device towards the tail clamp means.

The centring rails are advantageously optionally moveably configured separately or together by means of pneumatic cylinders, servo drives or suchlike as actuating means, wherein the actuating means is preferably connected with a control and/or regulation device. The possibility that one of the centring rails is configured to be permanently positioned, whilst the other centring rail is moveable relative to the permanently positioned centring rail. Both centring rails can also be permanently positioned, e.g. at a fixed unchangeable distance from each other.

A preferred embodiment of the invention is characterised in that the tail clamp means comprises at least two clamp jowls that can be moved towards or away from each other, arranged at the output side end of the catching and centring device in transport direction T to be able to clamp the tail of the fish lying tail first. With these clamp jowls every fish can be clamped and held in almost any position in a simple way. Other clamping elements can also be used in place of two clamp jowls.

Particularly preferably the clamp jowls—or also any other clamping element—are moveably configured, either separately or together, by means of pneumatic cylinders, servo drives or suchlike as actuating means, which are preferably connected with a control and/or regulation device. The possibility that only one clamp jowl is moveably configured, which moves relative to a permanently positioned clamp jowl, also exists.

Expediently the or every clamp jowl, preferably both clamp jowls, is/are mounted on the support body to pivot around a pivot axis SK, which is aligned parallel to transport direction T. The clamp jowls can however also be configured to pivot around pivot axes, that differ from pivot axis SK in such a way that one clamp jowl or both clamp jowls can be pivoted from an open release position into a clamping position and back again. Linearly moveable clamping elements can also be used.

A particularly preferred embodiment of the invention is characterised in that the take-over device comprises a saddling aid and a pressing element, wherein the unit configured by the saddling aid and the pressing element is moveable. The movability in particular relates to a movement relative to the frame structure or in particular also relative to the catching and centring device and to the transport device. The saddling aid can also be described as an abdominal cavity pusher, as the saddling aid is configured and adapted for entering the abdominal cavity of the fish to be saddled. The take-over device reliably and precisely ensures the final transfer position of the fish, from which the fish can be taken over optimally aligned for saddling on the holding device. The fish held and centred by the catching and centring device is preferably lifted and positioned by the take-over device moved into the abdominal cavity. This lifting describes the loosening or pre-lifting of the fish from the centring rails of the catching and centring device, namely whilst the tail clamp means is closed, so that the holding apparatus can pull the fish automatically from the take-over device—having first released the fish through opening the tail clamp means of the catching and centring device—and transport it away.

The unit consisting of saddling aid and pressing element advantageously comprises a moveable sliding carriage, of which the saddling aid and the pressing element form parts, wherein the sliding carriage is configured and adapted moveable relative to the transport device. Correspondingly the sliding carriage is also configured and adapted relative to the catching and centring device. The saddling aid and the pressing element can also be arranged on other support bodies, which can in turn be moveably configured and arranged relative to the catching and centring device.

A preferred further development of the invention is characterised in that the take-over device comprises a linear guide and a drive means as an actuating means, which is preferably connected with a control and/or regulation device, by means of which the sliding carriage carrying the saddling aid and the pressing element is configured to move back and forth in transport direction T of the transport device and against transport direction T of the transport device. A construction by means of which the saddling aid and the pressing element can be moved relative to the transport device and also to the catching and centring device in such a way that the saddling aid is moveably configured and adapted from a waiting position into the stationary fish as a working position and back again is crucial. The same also applies to the pressing element, which is also configured and adapted to move from a waiting position into a position above the back of the fish as a working position and back again. Saddling aid and pressing element can also be arranged separately on different sliding carriages or suchlike.

Expediently the drive means is a slider-crank mechanism, the crank arm of which is connected with the sliding carriage carrying the saddling aid and the pressing element in operative connection via a thrust rod. Every other drive means, for example servo drives, pneumatic cylinders or suchlike, can also be used.

An advantageous embodiment is characterised in that the saddling aid comprises two bearing rails aligned substantially parallel to transport direction T of the transport device, which are arranged parallel at a distance from each other for forming a gap, wherein the distance of the bearing rails is at least as great as the width of the holding plate entering the gap during transport of the holding apparatus. The at least two bearing rails quasi form a type of fork. There is sufficient space between the two bearing rails to allow the holding apparatus to enter at least with parts of its holding plate between the bearing rails, and especially also protrude upwards in the direction of the fish to be saddled. The saddling aid is further also open in the direction of transport direction T of the transport device's rear free end, so that the holding apparatus or the holding plate of the holding apparatus protruding above the bearing rails can exit freely to the rear in transport direction T of the transport device. The bearing rails can be configured rigid and fixed with a fixed distance to each other. The single-part or multi-part bearing rails can however be configured optionally adjustable, for example for setting the distance to each other.

The saddling aid is advantageously configured as an actuating means by means of pneumatic cylinders, servo drives or suchlike as actuating means, which is preferably connected with a control and/or regulation device, moveably mounted relative to the sliding carriage.

Particularly preferably the saddling aid is mounted on the sliding carriage to pivot around a pivot axis $S_{A1}$, which is directed transverse to transport direction T of the transport device. The pivotability of the saddling aid or components of the same configures this for completing a kind of tilt movement and it is configured and adapted to enable a submersion into the abdominal cavity of the fish and the lifting or lifting off of the fish from the centring rails of the catching and centring device simply and precisely.

The apparatus comprises, preferably in the region of the saddling aid or arranged on the same, at least one detection means for positioning the saddling aid within the abdominal cavity. The end of the abdominal cavity can be detected, for example by means of sensors or other suitable measuring means in order to stop the saddling aid in good time at the end of the abdominal cavity and before the fish can be damaged during a collision. Optionally the saddling aid can be spring-mounted entirely or at least partly on one of the bearing rails in such a way that a defined end point of the movement of the saddling aid in the abdominal cavity can be determined with the spring stroke and/or with the pressure resistance. The safe, damage-free positioning of the saddling aid inside the fish and the centred saddling of the fish on the holding apparatus can be ensured with the or each of the detection means, which can be placed in different positions and is preferably connected with a control and/or regulation device.

An advantageous embodiment is characterised in that the pressing element comprises a holding arm and a pressing shoe arranged at a free end of the holding arm. The length of the holding arm can vary. This can mean that the length of the holding arm is determined depending on the fish to be saddled, wherein a length where the pressing shoe arranged at the free end of the holding arm can be brought in operative connection at the rear behind the abdominal cavity in transport direction T of the transport device for the fish lying on the saddling aid is preferable.

The pressing shoe is particularly preferably hinged and spring-loaded on the holding arm. This guarantees a particularly safe contact between the pressing element and the fish to be held, as the pressing shoe can adapt to the contour of the fish at least in part. The shape and/or the surface of the pressing shoes, in particular on the side facing the fish, can vary. The position of the pressing shoe and its fastening element to the holding arm can also be realised in different ways. In place of a spring-loaded configuration a pneumatic cylinder or suchlike can for example also be provided for a relative movement of the pressing shoe in relation to the holding arm. Such a rigid connection between holding arm and pressing shoe and a single-part, integral configuration are of course also possible.

An optional further development of the invention provides that the holding arm is configured to be moved relative to the sliding carriage at least sectionally in transport direction T of the transport device and against transport direction T of the transport device. The single-part or multiple-part configuration of the holding arm can be moved against transport direction T by means of the sliding carriage on the one hand. On the other hand, a preferably overlaid movement relative to the sliding carriage can also be realised in that a holding arm section, on which the pressing shoe is arranged, is for example guided on a further holding arm section arranged on the sliding carriage and configured and adapted to be moved back and forth relative to the same in a linear alignment. This will realise the position of the operative connection or the contact position between pressing shoe and fish better and more accurately still, preferably approx. 50 mm behind the abdominal cavity of the fish to be saddled.

Expediently, the holding arm is telescopic, preferably by means of a pneumatic cylinder as the actuating means, which is preferably connected with a control and/or regulation device, and is configured extendable and contractible. Other embodiments of the actuating means can however also be used.

An advantageous embodiment of the invention is characterised in that the pressing element or the holding arm are mounted to pivot around a pivot axis $S_{A2}$, which is mounted on the sliding carriage and directed transverse to transport direction T of the transport device. The pivotable configuration of the holding arms or at least parts thereof allow the holding arm to be moved from a waiting position to a holding position, in which the pressing shoe is in contact with the fish to be saddled. The pivot axis $S_{A2}$ can be configured offset to pivot axis $S_{A1}$ of the saddling aid.

Particularly preferably the pivot axes $S_{A1}$ and $S_{A2}$ can be identical, e.g. lie on the same pivot point. The pivot axes $S_{A1}$ and $S_{A2}$ preferably extend substantially parallel to each other. An alignment that differs from this is however also possible.

The pressing element is preferably allocated a pneumatic cylinder, a servo drive or suchlike as an actuating means, which is preferably connected with a control and/or regulation device for carrying out the pivot movement relative to the sliding carriage.

In a particularly preferred embodiment, each actuating means and/or each detection means is connected with a control and/or regulation device. A common control and/or regulation device can optionally be provided. In other embodiments several, or one for each actuating means and each detection means, which can each also comprise sensors, are provided with separate control and/or regulation devices, which can for example be brought or are in operative connection with each other by means of a superordinate control and/or regulation device. The or each control and/or regulation device allow an optimal adjustment of the detection and movement of the component in question with each other.

In an advantageous further development of the invention, at least one further processing station for processing the beheaded and eviscerated fish is arranged along the transport path in transport direction T of the transport device behind the take-over device.

Particularly preferably, the at least one processing station is a separating device for separating the meat from the bone structure of the beheaded and eviscerated fish. Other processing stations requiring the saddling of the fish can alternatively or cumulatively also be provided.

The problem is also solved by an apparatus for automatedly obtaining meat from beheaded and eviscerated fish of the type mentioned above in that the apparatus for automatedly obtaining meat from beheaded and eviscerated fish further comprises an apparatus for automatedly saddling beheaded and eviscerated fish on holding apparatuses of the transport device, wherein the apparatus for automatedly saddling beheaded and eviscerated fish is arranged in transport direction T before the processing station.

The apparatus for automatedly saddling beheaded and eviscerated fish on holding apparatuses of the transport device is preferably configured and adapted as disclosed herein.

An advantageous embodiment of the invention is characterised in that the apparatus for automatedly saddling beheaded and eviscerated fish is an integral part of the apparatus for automatedly obtaining meat from beheaded and eviscerated fish with a common transport device for transporting the fish in transport direction T tail first and abdominal cavity downwards.

Optionally the processing station is a separating device, wherein the separating device has at least two rotatingly driveable and controllable circular knives, which are arranged at a distance on opposing sides of the transport path for forming a gap S. Other processing stations, e.g. individual or several arranged one behind the other, can also be used.

It is possible with the features described above in connection with the apparatus for automatedly obtaining meat from beheaded and eviscerated fish to obtain the advantages already described in detail in connection with the apparatus for automatedly saddling. In order to avoid repetition, we therefore refer to the corresponding passages, which equally apply to the apparatus for automatedly obtaining meat from beheaded and eviscerated fish.

The problem is also solved by a method for automatedly saddling beheaded and eviscerated fish on holding apparatuses of a transport device of the kind mentioned hereinbefore, with the following steps: automatic feed of each beheaded and eviscerated fish by means of a feed device directly to the transport device, automatic transfer of each beheaded and eviscerated fish, abdominal cavity first, from the feed device to a catching and centring device, automatic centring and holding each beheaded and eviscerated fish parallel to a transport direction T of the transport device and tail first in transport direction T by means of the catching and centring device, automatic take-over of each beheaded and eviscerated fish from the catching and centring device by means of a take-over device in such a way that the beheaded and eviscerated fish lies in a transfer position on the take-over device, and automatic removal of each beheaded and eviscerated fish located in the transfer position from the take-over device by means of inserting a holding apparatus of the transport device conveyed into the abdominal cavity of each fish, wherein the holding apparatus transported in transport direction T pulls the beheaded and eviscerated fish from the take-over device. Each fish supplied to the feed device manually or preferably automatically, for example by means of a handling device, a robot or suchlike, is automatically and without any interference from an operator positioned and directed exactly by the feed device above the catching and centring device and the take-over device, and is moved to a transfer position, from which the holding apparatus on which the fish is to be saddled can take over the fish through submersion into said fish and pull it from the take-over device, wherein the fish is held by the take-over device when the holding apparatus is submersed in the fish and pressed onto the holding apparatus. This ensures a machine saddling in a safe and reproducible way.

The beheaded and eviscerated fish are moved, preferably individually, and clocked substantially transverse to their longitudinal expansion, to the region of an output position of the catching and centring device. Substantially transverse describes the main movement direction and specifically includes that the fish can also be moved in a diagonal alignment, abdominal side first into the output position, wherein the fish lie in the output position with their longitudinal expansion then preferably parallel to transport direction T of the transport device.

In an advantageous further development of the invention each beheaded and eviscerated fish is determined upon feed with regard to detecting its ventral/dorsal position and/or its tail/head position and/or its height or thickness. Fish in an incorrect position and/or of an incorrect size can be detected in this way, which can make the saddling more effective and/or more precise overall, as fish in an incorrect position can for example be separated out and/or saddling can be adapted to the size of the fish.

Each beheaded and eviscerated fish advantageously lies substantially parallel to transport direction T, with its tail side first in transport direction T of the transport device, with its head side abutting against a shoulder and its abdominal cavity pointing downwards in the output position, and will therefore automatically fall into the catching and centring device in this way. Abutment against the shoulder can be realised through (passive) sliding alone, in particular caused by an inclined positioning of the feed device. The fish can however also be actively pushed or pulled against the shoulder.

In a preferred further development, each beheaded and eviscerated fish is centred in the catching and centring device and its tail is clamped in such a way that the fish middle is centred on the processing middle and the fish is held there. The centring and clamping can take place simultaneously. Centring preferably takes place first before the centred fish is then clamped by its tail. Centring can for example take place passively, for example in that the fish falls onto centring rails or suchlike, which centre the fish from the sides. Centring can also take place actively in that centring means for example press the fish into the central position in relation to the processing middle of the apparatus.

The beheaded and eviscerated fish is preferably removed by the take-over device from the centring rails of the catching and centring device and moved into the transfer position, in which each beheaded and eviscerated fish lies on a saddling aid of the take-over device and its tail is also held by a tail clamp means of the catching and centring device. The take-over device is moved into the abdominal cavity of the fish for this, so that the fish is lifted from the centring rails while its tail is clamped. In other words, the fish is brought into a kind of suspended position by the take-over device, in which the fish is centred from inside the abdominal cavity and held by its back on the outside. The tail is preferably first also clamped, wherein this clamping is disconnected, so that the fish is free and can be saddled on the same by means of pulling by the holding apparatus of the take-over device.

In a particularly preferred variant, the saddling aid is directed in transport direction T and diagonally downwards and moved into the abdominal cavity, and is then swivelled clockwise into a substantially horizontal alignment, so that the beheaded and eviscerated fish is lifted onto or from the centring rails of the catching and centring device with a clamped tail. The saddling aid can optionally be swivelled one after the other or overlaid together and with the sliding carriage linearly in transport direction T and relative to said sliding carriage around a pivot axis $S_{A1}$.

A defined end position of the saddling aid within the abdominal cavity is advantageously detected, so that the saddling aid is stopped when it reaches the end position. The position of the saddling aid and/or its end position within the abdominal cavity can be monitored, so that the saddling aid stops the movement in particular in transport direction T of the transport device when the end of the abdominal cavity is reached in order not to damage the fish.

A particularly advantageous further development of the method is characterised in that a holding force is applied to the back of the beheaded and eviscerated fish after take-over of the beheaded and eviscerated fish from the centring rails of the catching and centring device to the saddling aid of the take-over device into the transfer position by means of a pressing element, preferably in transport direction T behind the abdominal cavity of the beheaded and eviscerated fish, so that the fish clamped at its tail is held between the saddling aid and the pressing element. The fish is preferably held on the saddling aid by a pressing element, which holds the back of the fish. To put it differently, the fish is sandwiched between saddling aid and pressing element in the transfer position. The pressing element is moved linearly from a retracted waiting position and swivelled around a pivot axis $S_{A2}$ for this until the pressing element comes into contact with the back of the fish in the region behind the abdominal cavity.

For the final saddling of the fish, holding apparatuses driven rotatingly in transport direction T of the holding apparatuses are particularly preferably moved into the abdominal cavity in such a way that holding plates of the holding apparatuses are moved between two bearing rails of the saddling aid arranged at a distance from each other, wherein the holding plates protrude at least partly upwards in the direction of the beheaded and eviscerated fish via the positioning rails of the saddling aid for capturing a central bone of the beheaded and eviscerated fish upon exit of the holding plate from the saddling aid with the holding means directed in transport direction T at the latest. The holding plate of the holding apparatus is moved along the transport path in transport direction T, is submerged in the abdominal cavity of the fish between the bearing rails of the saddling aid, protrudes upwards in the direction of the central bone of the saddled fish and takes up the fish directly in this way. The pressing element prevents an upward escaping of the fish and therefore creates a firm saddling of the fish on the holding plate, which is moved onward together with the fish in transport direction T and pulls the fish from the take-over device.

The beheaded and eviscerated fish are advantageously pulled from the saddling aid by the movement of the holding apparatuses in transport direction T, wherein each beheaded and eviscerated fish is released through opening the tail clamp means when the beheaded and eviscerated fish is captured by the holding plate. The timing of the release of the fish from the tail clamp means can vary, but takes place when the fish is moved by the holding apparatus in transport direction T of the transport device at the latest.

The problem is also solved by a method for automatedly obtaining meat from beheaded and eviscerated fish of the kind mentioned hereinbefore in that the beheaded and eviscerated fish are automatically saddled on the holding apparatuses. Particularly advantageously the automatic saddling of the beheaded and eviscerated fish on the holding apparatuses is carried out with an apparatus or with a methodas disclosed herein.

The advantages resulting from this have already been described in detail above in connection with the apparatus, which is why we refer to the above passages in order to avoid repetition.

BRIEF DESCRIPTION OF THE DRAWINGS

Further expedient and/or advantageous features and further developments of apparatuses for automatedly saddling beheaded and eviscerated fish on holding apparatuses and for automatedly obtaining meat from beheaded and eviscerated fish as well as the corresponding methods result from the description. Particularly preferred embodiments are explained in more detail with reference to the drawings. In the drawings:

FIG. 2 a schematic illustration of a preferred embodiment of an apparatus according to the invention for automatedly obtaining meat from beheaded and eviscerated fish in a perspective view diagonally from above and from the front;

FIG. 3 a schematic illustration of a feed device of the apparatuses according to FIGS. 1 and 2 in a perspective illustration;

Figure 6:
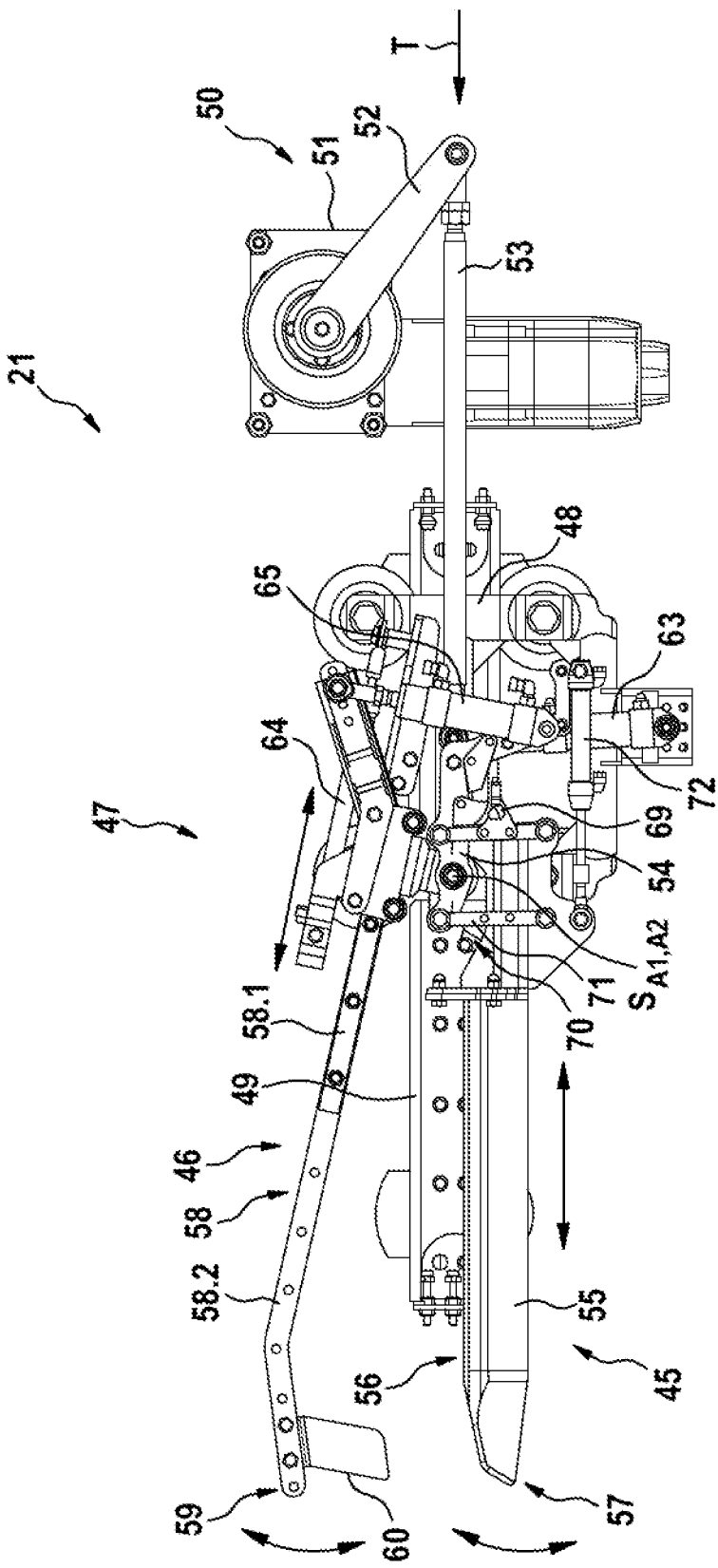
FIG. 6 a schematic illustration of a further embodiment of the take-over device of the apparatuses according to FIGS.
Figure 7:
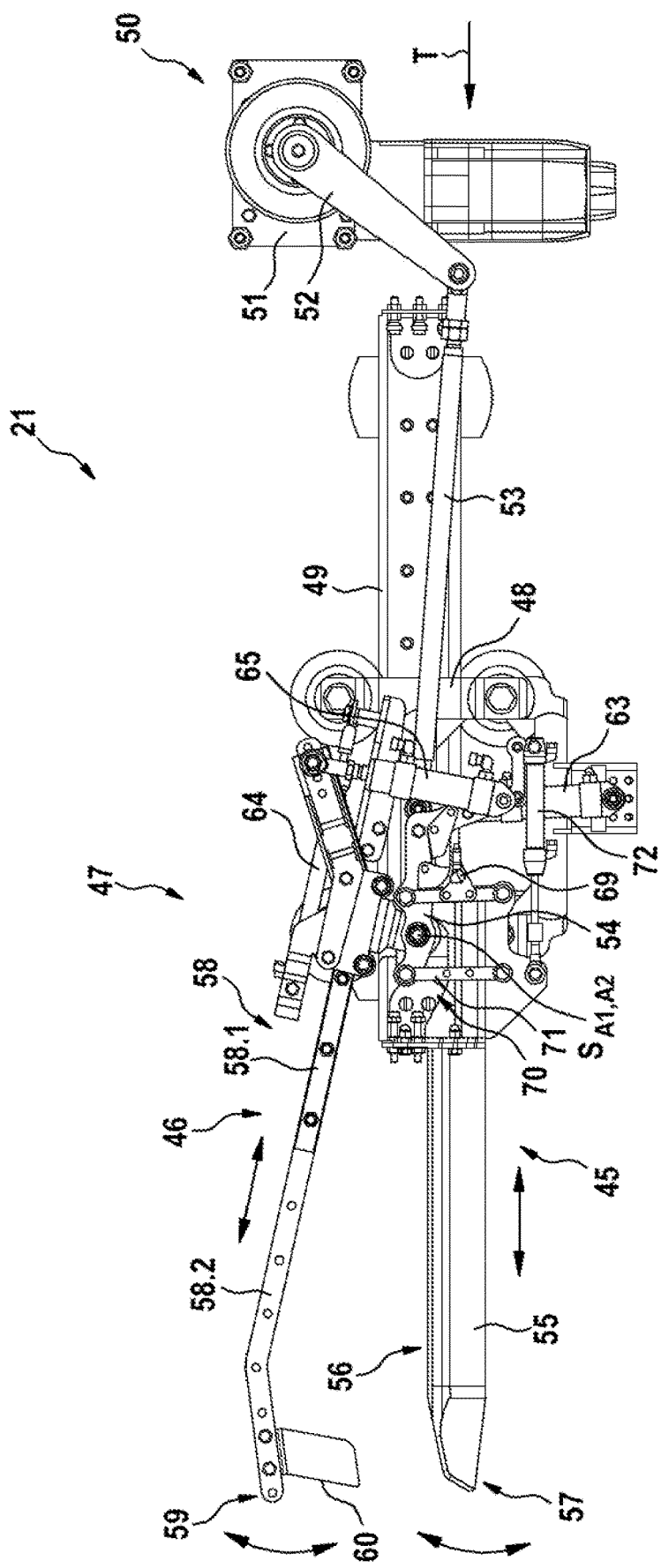
Figure 8:
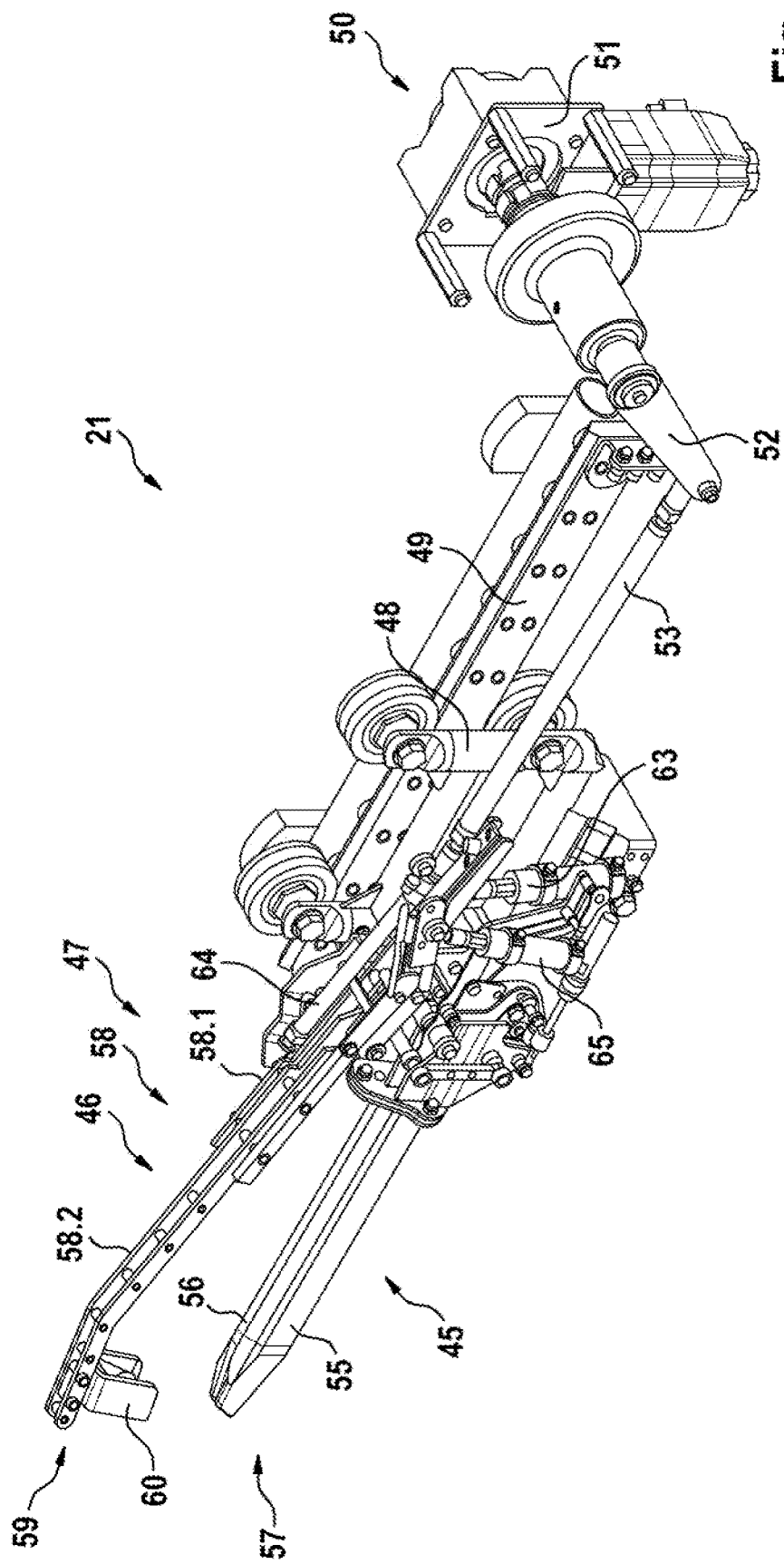
Figure 9:
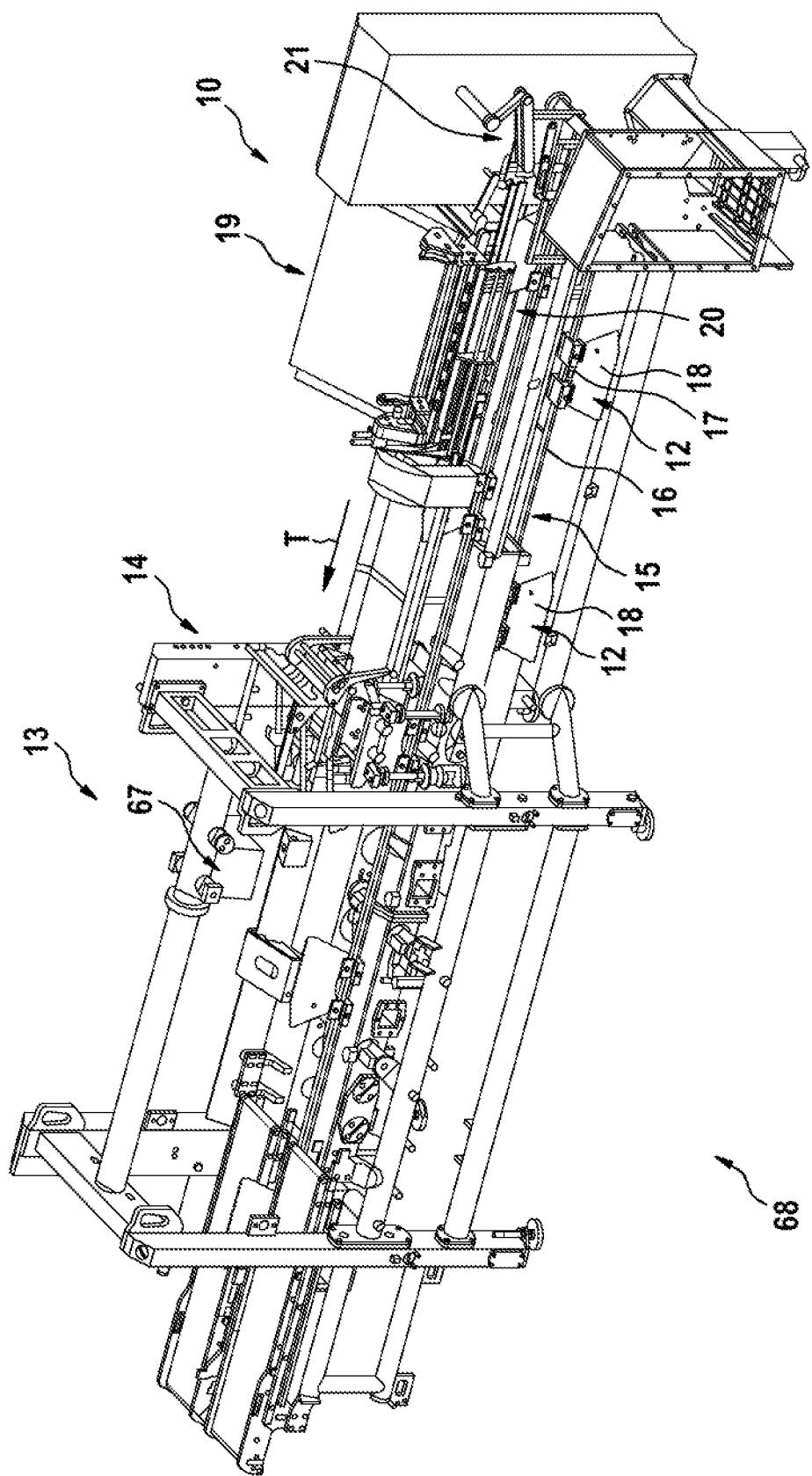

1 and 2 in a perspective illustration with a saddling aid and pressing element in a waiting position;

FIG. 7 the schematic illustration according to FIG. 6 with a saddling aid and pressing element in a working position;

FIG. 8 a further schematic illustration according to FIG. 7 in another perspective; and FIG. 9 a schematic illustration of a preferred embodiment of an apparatus according to the invention for automatedly obtaining meat from beheaded and eviscerated fish.

DETAILED DESCRIPTION OF THE INVENTION

The apparatus illustrated in the drawing is configured and adapted for automatedly saddling beheaded and eviscerated fish on holding apparatuses for automated further processing of the beheaded and eviscerated fish at a downstream processing station. Specifically, the illustrated apparatuses are configured and adapted for automatedly saddling beheaded and eviscerated salmon with subsequent obtaining of the meat from the same. The invention is configured and adapted in the same way for automatedly saddling other fish species, wherein the fish can also be processed in a way other than that for obtaining meat.

As mentioned, the apparatus 10 for automatedly saddling beheaded and eviscerated fish 11 on holding apparatuses 12 is configured and adapted for automated further processing of the beheaded and eviscerated fish 11 at a downstream processing station 13.

According to the invention, the apparatus 10 comprises a frame structure, a transport device 15 arranged on the frame structure 14, configured and adapted for transporting beheaded and eviscerated fish 11 tail first and abdominal cavity downwards in transport direction T along a transport path, wherein the transport device 15 comprises a transport unit 16 that is driven rotatingly and at least one holding apparatus 12 fitted to the same, comprising at least one fastening element 17 and one holding plate 18, which is configured and adapted for holding the beheaded and eviscerated fish 11 during processing of the same, a feed device 19, configured and adapted for automatically feeding the beheaded and eviscerated fish 11 into the region of the transport device 15, a catching and centring device 20, configured and adapted to catch the beheaded and eviscerated fish 11 released by the feed device 19 with the abdominal cavity downwards, and for centring the same parallel to transport direction T, as well as a take-over device 21, configured and adapted to take over the beheaded and eviscerated fish 11 from the catching and centring device 20, for holding the beheaded and eviscerated fish 11 in a transfer position, and for releasing the beheaded and eviscerated fish 11 as soon as a holding apparatus 12 transported through the beheaded and eviscerated fish 11 in the region of the abdominal cavity takes captures the beheaded and eviscerated fish 11 and pulls it in the transfer position from the take-over device 21.

The features and further developments described as follows constitute preferred embodiments, seen on their own or in combination with each other. We specifically point out that features, which are summarised in the description and/or the drawing or described in a common embodiment, may also develop the apparatus 10 described above in a functionally independent way.

The transport unit 16 is preferably a transport chain that is driven rotatingly by means of a drive as an actuating means with an upper run 22 and a lower run 23. Saddling the beheaded and eviscerated fish 11 on the holding apparatuses 12 takes place in the region of the upper run 22. Several holding apparatuses 12 are preferably fitted on the transport chain, which circulate with the transport chain. The disconnectable fastening element of the holding apparatuses 12 on the transport chain is realised by means of the fastening elements 17, on which the holding plates 18 are in turn arranged. The preferably plate-shaped holding plates 18 have, when transported in the upper run 22 in transport direction T, holding means 24 at their upward facing, e.g. facing in the direction of the fish to be saddled, a free edge, which are configured and adapted for engaging/taking up with/the middle bone of the fish 11 to be saddled. This holding means 24 can for example be a simple toothed structure or suchlike. Other holding apparatuses 12 that are driven rotatingly and in particular also other holding means 24 can however also be used.

The feed device 19 preferably comprises a cascade-like receptacle 25 for receiving at least two beheaded and eviscerated fish 11, wherein receptacle sections 25.1, 25.2, 25.3 of the receptacle 25 configured for receiving individual beheaded and eviscerated fish 11 are separated from each other by means of flap elements 27 opened and closed with actuating means 26. Other feed systems, by means of which fish 11 can be individually transported into the region of the transport device 15, can alternatively be used. The fish 11 can for example also be deposited individually in their desired alignment by means of a handling apparatus as a feed device 19 in the region of an output position. Such feed devices 19, unknown in connection with an automated saddling module, preferably comprise a base body 28 and a flap system, which has a traverse 29 and flap elements 27 pivotably arranged on the same. The base body 28 can be an inclined base plate, on which the fish, retained and released by the individual flap elements 27, slide independently, e.g. aided only by gravity, in the direction of the catching and centring unit 20. In other embodiments the base body 28 can also be a driven conveyor belt or suchlike. A closable opening for separating out individual fish 11 can optionally be configured for separating out individual fish 11, in the example of the base plate e.g. a closable floor flap 30, which can be opened and closed again with the actuating means. In the embodiment example shown the floor flap 30 is configured and arranged in the region of the receptacle section 25.3 in the output position 31. The floor flap 30 or other separation mimics can however also be configured and provided in other positions.

The traverse 29 quasi straddles the base plate. The flap elements 27 are separately pivotably mounted on the traverse 29. The flap elements 27 can stand in a closed position and be brought into an open position against a preferably defined spring force. Each flap element 27 is preferably allocated a separately controllable pneumatic cylinder as an actuating means 26. A preferred further development is characterised in that the flap elements 27 are configured and adapted for an individual and clocked output of the beheaded and eviscerated fish 11 substantially transverse to their longitudinal expansion from receptacle section to receptacle section 25.1 to 25.3 up to the region of an output position 31 and the catching and centring device 20 in a controllable way. This offers the possibility of always providing a fish 11 intended for saddling in the output position 31 in order to guarantee a continuous and efficient saddling.

Figure 1:
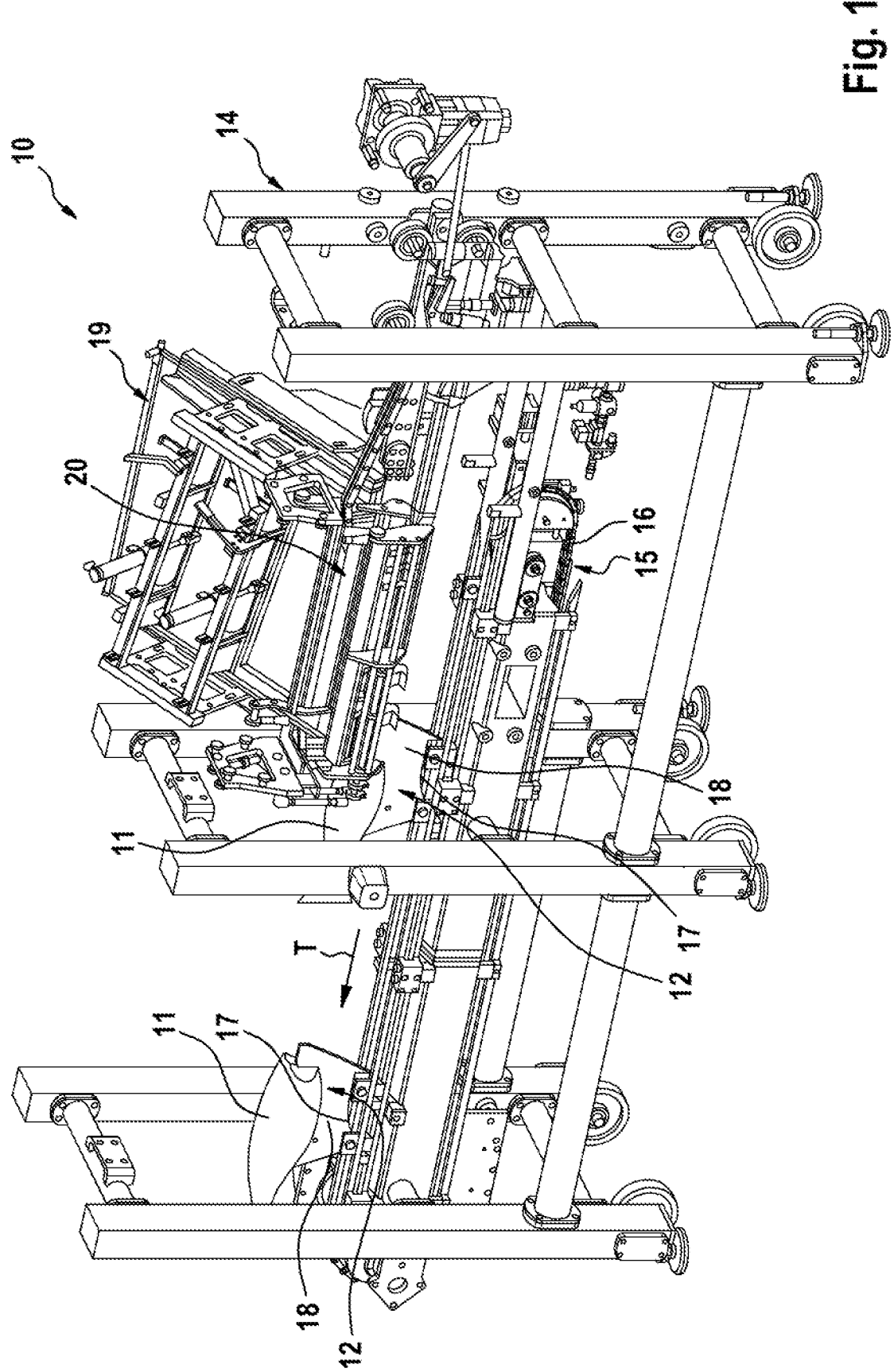
FIG. 1 shows a schematic illustration of a preferred embodiment of an apparatus according to the invention for automatedly saddling beheaded and eviscerated fish on holding apparatuses in a perspective view diagonally from above and from the front.
Figure 3A:
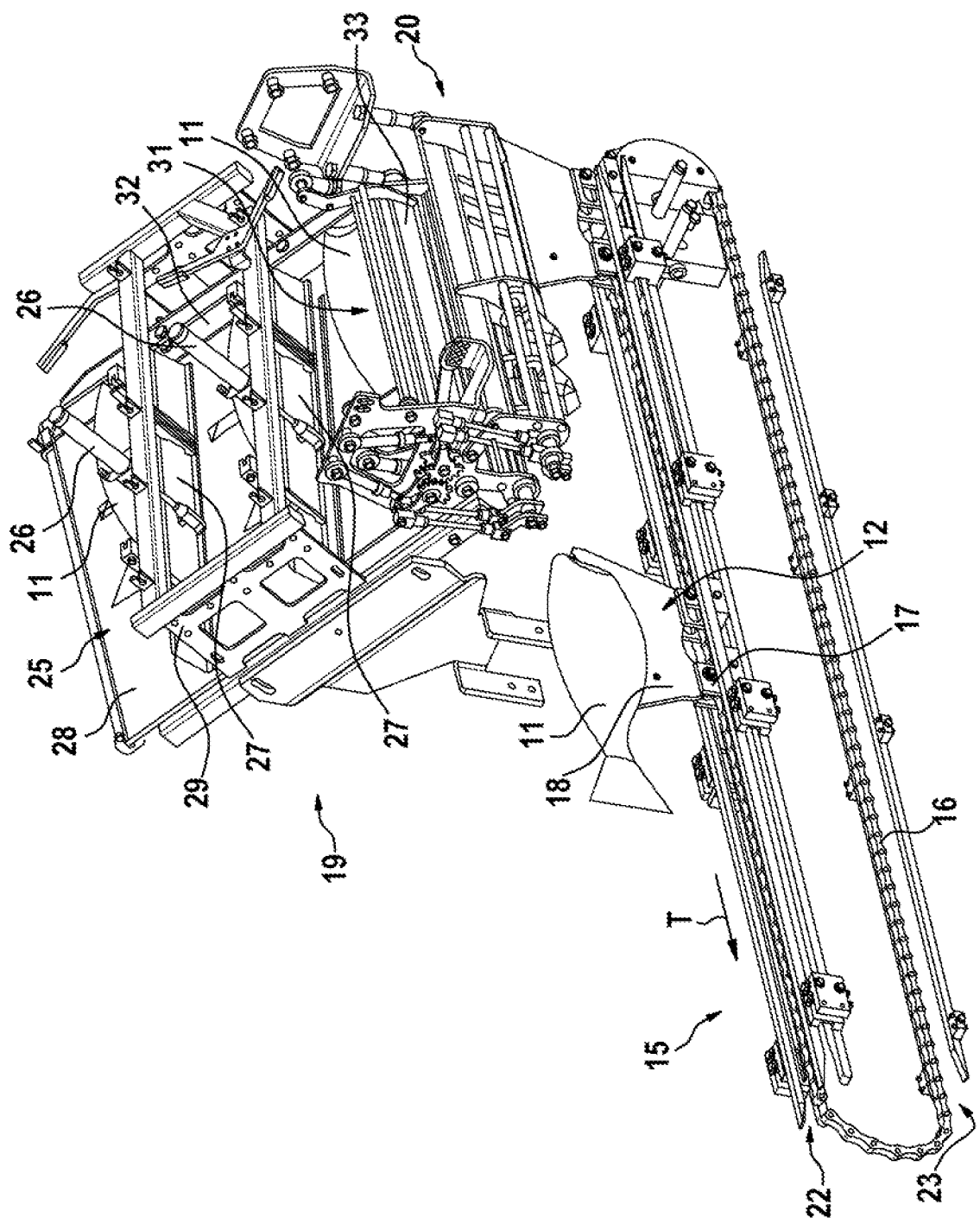
FIG. 3a the illustration according to FIG. 3 in another perspective.

The fish preferably lie slightly diagonal in the individual receptacle sections 25.1 to 25.3, e.g. initially in fact not parallel to transport direction T of the transport device 15, so that the fish 11 reaches its final position only directly in the output position 31, preferably parallel to transport direction T. In the embodiment shown (see in particular FIG. 3) the diagonal position is limited to the receptacle sections 25.1 and 25.2. The diagonal position can for example be realised in that flap elements 27 are aligned and arranged diagonally in relation to the base body 28. The traverse 29 is aligned diagonally to the inclined base plate for this. Diagonal means in this context that the pivot axes of the flap elements 27 are not aligned vertical to the outer edge of the base plate. The incline of the base plate connected with the diagonal position of the receptacle sections 25.1 to 25.3 cause the fish 11 to slide into the respective receptacle sections 25.1 to 25.3 in a defined end position in the region of the (beheaded) head. In other words, the fish 11 are moved against a shoulder 32 with their head side or slide against the same, which allow calculation of the geometry of the fish 11 and in particular also the position of the abdominal cavity for further process steps.

The feed device 19 can be allocated nozzles, for example to wet the surface of the base plate with water in order to support a sliding of the fish 11 in the direction of the output position. The surface can also be processed, for example polished or structured, in order to support the transport of the fish from receptacle section to receptacle section 25.1 to 25.3. The base plate can be closed or porous or equipped with openings, for example for conducting water or other liquids, secretions and suchlike drained away from the fish.

In a preferred further development of the invention a feed device 19 comprises detection means at least for detecting the ventral/dorsal position and/or the tail/head position and/or the height or thickness of the beheaded and eviscerated fish. A detection means can also be optionally provided. Several detection means can also be used. The or each detection means, irrespective of whether it is configured and adapted mechanically, optically or in combination with each other, is preferably arranged on the input side of the feed device 19. Other or additional positions for the detection means are however also possible. It is preferred that a sensor 73 is allocated to each receptacle section 25.1 to 25.3 as a detection means.

In the preferred embodiment according to the drawing the catching and centring device 20 is arranged below the feed device 19 in the region of output position 31 of the same in such a way that the beheaded and eviscerated fish 11 can be moved from the feed device 19 with the abdominal cavity first, tail in transport direction T of the transport device 15 first into the catching and centring device 20. Below means in this context that the fish 11 preferably reach the catching and centring device 20 independently after leaving the feed device 19. At least one release flap 33 is arranged in the region of the output position 31 in the transition from the feed device 19 to the catching and centring device 20, to which the feed device 29 and/or the catching and centring device 20 is allocated. The release plate 33, for example activated by means of an actuating means, is separate and preferably adapted to the flap elements 27 of the feed device 19, for example with an actuating means, allows the precise clocking of fish 11 to be saddled, in particular adapted to the transport speed of the transport device 15, to the catching and centring device 20. The release plate 33 is preferably aligned parallel to transport direction T of the transport device 15, so that the fish 11 lies in a defined position, namely fish with head side against shoulder 32, abdominal cavity downwards, tail first and parallel to transport direction T of the transport device 15, directly prior to the automatic transfer to the catching and centring device 20. In the embodiment according to FIG. 3, the release plate 33 is pivotably mounted on the catching and centring device 20. The release plate 33 itself is preferably a simple rail, which extends across the entire width of base plate.

Figure 4:
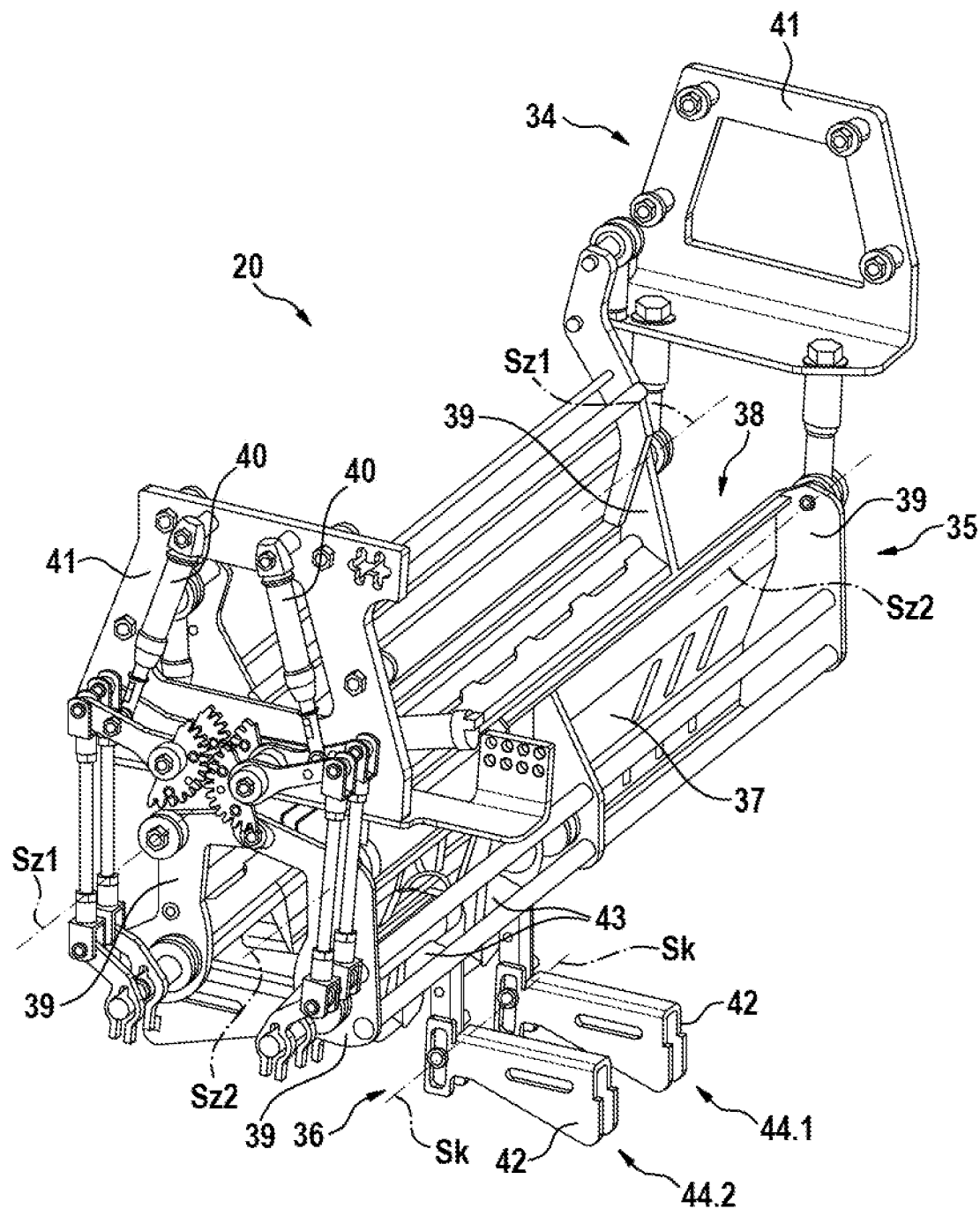
FIG. 4 a schematic illustration of a catching and centring device of the apparatuses according to FIGS. 1 and 2 in a perspective illustration.

The catching and centring device 20 comprises a support body 34 arranged on the frame structure 14, to which a holding and centring means 35 and a tail clamp means 36 are allocated, in the preferred embodiment (see in particular FIG. 4). The support body 34 is preferably permanently positioned on the frame structure 14. The holding and centring means 35 is preferably configured and adapted for centring the fish 11 to be saddled with their fish middle on the (subsequent) processing middle, e.g. the middle of the holding plate 18 of the holding apparatus 15 of the transport device 15, in order to pre-position the fish 11 in an optimal saddling position. The support body 34 is for example a frame 41 that is disconnectably fixed on the frame structure 14.

The holding and centring means 35 comprises at least two centring rails 37 arranged at a distance from each other and aligned substantially parallel to transport direction T of the transport device 15 for this, for forming a centring shaft 38, wherein the centring rails 37 are configured and adapted to move towards and away from each other for changing the distance from each other. The centring rails 37 are preferably mounted to pivot around pivot axes $S_{Z1}$ and $S_{Z2}$, which are aligned parallel to transport direction T of the transport device 15, on the support body 34. The centring rails 37 are arranged on pivot jowls 39, which are in turn mounted on the support body 34. The pivot jowls 39 optionally bring the opposing centring rails 37 into operative connection with each other in such a way that the activation of a centring rail 37 essentially and preferably leads to a synchronous movement of the second centring rail 37. The centring rails 37 preferably diverge at any rate in sections and particularly preferably at the output side end of the catching and centring device 20.

The centring rails 37 are advantageously optionally configured separately or together, moveable by means of pneumatic cylinders, servo drives or suchlike as actuating means 40. The possibility of one of the centring rails 37 being configured permanently positioned whilst the other centring rail 37 is moveable relative to the permanently positioned centring rail 37 is also possible. Both centring rails 37 can also be permanently positioned.

Figure 4A:
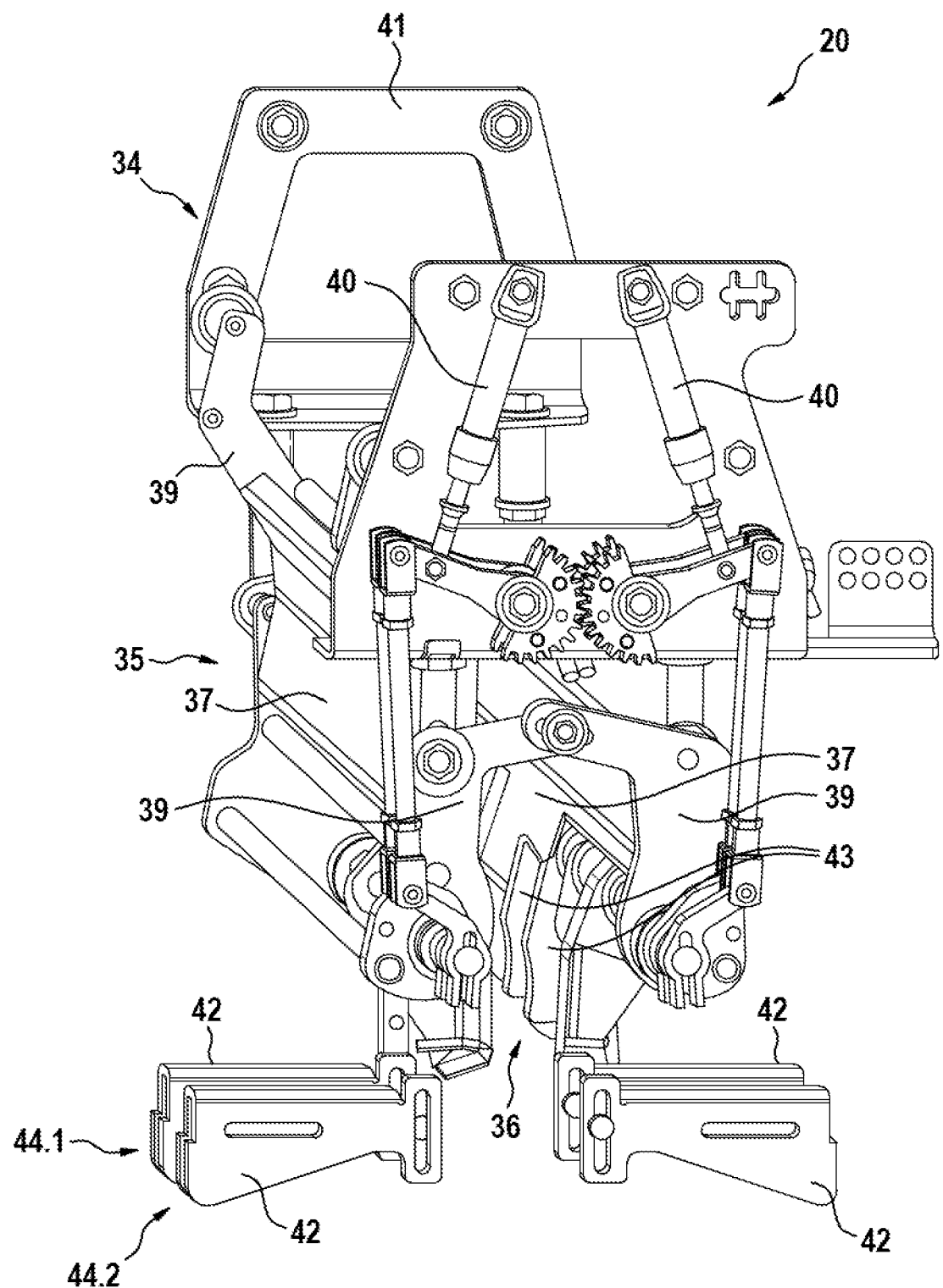
FIG. 4a the illustration according to FIG. 4 in another perspective.

The tail clamp means 36 in the preferred variant comprises at least two pairs of clamp jowls 43 that can be moved towards or away from each other, arranged in transport direction T of the transport device 15 in the direction of the output side end of the catching and centring device 20, in order to be able to clamp the tail of the first incoming fish 11 at the tail. Other clamping elements can also be used in place of two clamp jowls 43. Two clamp jowls 43 form a pair 44.1, 44.2. The clamp jowls 43 of a pair 44.1, 44.2 lie opposite each other in such a way that one clamp jowl 43 each is arranged on both sides of the centring shaft 38. In FIGS. 4 and 4a two pairs 44.1, 44.2 are provided, arranged one behind the other in transport direction T, so that it is possible to react to different fish sizes (with different positions of the fish tails). The clamp jowls 43 are pivotably arranged on holding elements 42. The holding elements 42 are preferably fixed on the frame structure 14. In the position where the clamp jowls 43 are arranged and can be pivoted towards or away from each other the centring rails 37 comprise perforations or recesses, so that the clamp jowls 37 can make contact with the tail or for the tail base region.

The clamp jowls 43 are preferably mounted around a pivot axis SK, aligned parallel to transport direction T, on the support body 34. The clamp jowls 43 can however also be pivotably configured around pivot axes, which differ from the pivot axis SK in such a way that one clamp jowl 43 or both clamp jowls 43 are pivotable from an opened release position into a clamping position and back again. The clamp jowls 43—or also any other clamping element—are particularly preferably configured optionally movable separately or together by means of pneumatic cylinders, servo drives or suchlike as (not explicitly illustrated) actuating means. The clamp jowls 43 are in optional operative connection with each other in such a way that the actuation of one clamp jowl 43 essentially and preferably leads to the synchronous movement of the second clamp jowl 43.

Figure 5:
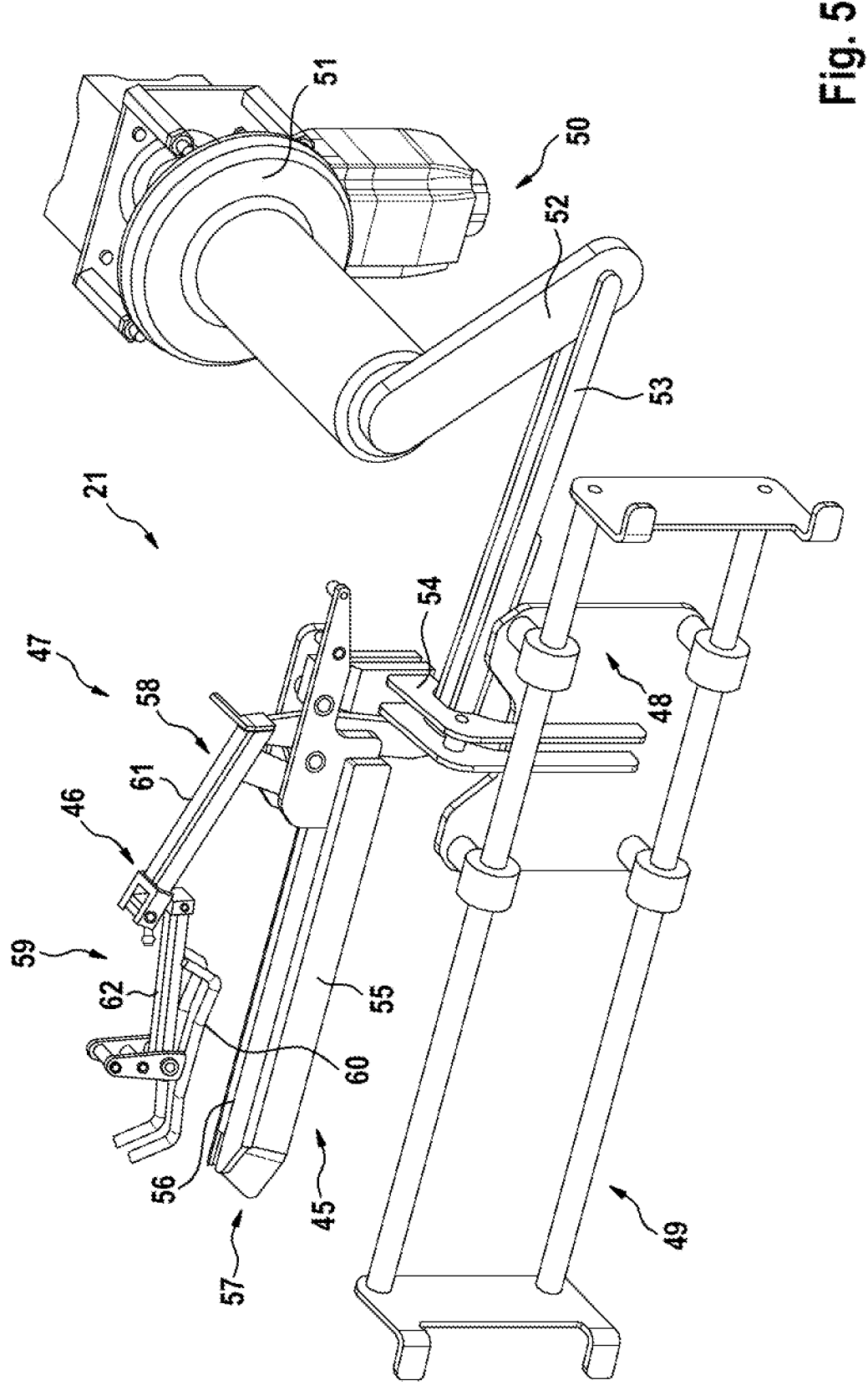
FIG. 5 a schematic illustration of a first embodiment of a take-over device of the apparatuses according to FIGS. 1 and 2 in a perspective illustration.

In FIG. 5 a simple embodiment of the take-over device 21 according to the invention is illustrated. The take-over device 21 comprises a saddling aid 45 and a pressing element 46, wherein the unit 47 formed by the saddling aid 45 and pressing element 46 is configured to be moveable. The movability relates in particular to a movement relative to the frame structure 14 or in particular also relative to the catching and centring device 20 and to transport device 15. The saddling aid 45 can also be described as an abdominal cavity pusher, as the saddling aid 45 is configured and adapted for entering the abdominal cavity of the fish 11 to be saddled. The unit 47 consisting of saddling aid 45 and pressing element 46 further comprises a moveable sliding carriage 48, allocated to the saddling aid 45 and the pressing element 46, wherein the sliding carriage 48 is configured and adapted to move relative to the transport device 15. The sliding carriage 48 is accordingly also configured and adapted relative to the catching and centring device 20. The take-over device 21 comprises a linear guide 49 for this, and a drive means as an actuating means 50, by means of which the saddling aid 45 and the pressing element 46 borne by the sliding carriage 48 are configured to move back and forth in transport direction T of the transport device 15 and against transport direction T of the transport device 15. In the embodiment according to FIG. 5 the drive means is a slider-crank mechanism 51, the crank arm 52 of which is in operative connection with the saddling aid 45 and the pressing element 46 born by the sliding carriage 48 via a thrust rod 53. The thrust rod 53 is arranged with one end on the crank arm 52 for this. The opposite end is connected with the sliding carriage 48. Any other drive means, for example servo drives, pneumatic cylinder or suchlike, can also be used.

The saddling aid 45 is fixed to a fastening element 54 arranged on the sliding carriage 48. The saddling aid 45 is formed by two bearing rails 55, 56 extending substantially parallel to transport direction T of the transport device 15, which are aligned and arranged at a distance from each other. The bearing rails 55, 56 themselves taper, preferably by distances consistent with each other, at the free end in transport direction T of the transport device 15 in order to facilitate their insertion into the abdominal cavity of the fish 11 to be saddled. The two bearing rails 55, 56 are arranged at a distance from each other in such a way that a gap is formed between them, parallel to transport direction T of the transport device 15, which is sufficiently wide to let the holding plate 18 of the holding apparatus 12 pass. The holding plate 18 is in fact moved along between the bearing rails 55, 56 to saddle the fish 11, wherein the holding plate 18 protrudes upwards through the existing gap above the bearing rails 55, 56. The two bearing rails 55, 56 form a fork-like clip, which is open at the free end 57. In the illustrated embodiment the bearing rails 55, 56 are rigid and configured permanently at a fixed distance from each other. The single-part or multi-part bearing rails 55, 56 can however be configured to be optionally adjustable, for example for setting the distance to each other.

The pressing element 46 comprises a holding arm 58 and a pressing shoe 60 arranged at the free end 59 of the holding arms 58 in the embodiment according to FIG. 5. The holding arm 58 is configured in two parts, with a support arm 61, which is permanently arranged on—optionally also hinged to—the fastening element 54, and a pivot arm 62, which is hinged on the support arm 61. The pressing shoe 60 in turn is hinged on the pivot arm 62. A pivoting of the pressing shoe 60 on the one hand and of the pivot arms 62 on the other can be triggered exclusively through product control in that the fish 11 to be saddled triggers the pivot movements. Pivoting can however also be carried out at least partially active, for example by means of suitable actuating means, as can be seen, for example for the embodiment of FIGS. 6 to 8, described below.

In the embodiment of the take-over device 21 according to FIGS. 6 to 8, the saddling aid 45 is in principle configured as described previously. The actuating means 50 for moving the sliding carriages 48 is configured in a comparable way. However, the saddling aid 45 is not only moveable back and forth together with the sliding carriage 48 linear in transport direction T of the transport device 15. A further actuating means 63 is allocated to the saddling aid 45. The saddling aid 45 is pivotably mounted on the sliding carriage 48 or on the support body 54, and in particular configured relative to the same, by means of a pneumatic cylinder, servo drive or suchlike as an actuating means 63. The saddling aid 45 is mounted to pivot around a pivot axis $S_{A1}$ on a sliding carriage 48 for this, wherein the pivot axis $S_{A1}$ is aligned transverse to transport direction T of the transport device 15.

The take-over device 21 comprises, preferably in the region of the saddling aid 45 or arranged on the same, at least one detection means for positioning the saddling aid 45 within the abdominal cavity of the fish 11 to be saddled. Optionally the saddling aid 45 can be spring-mounted, either entirely or at least at the bearing rails 55, 56, in such a way that a defined end point of the movement of the saddling aid 45 in the abdominal cavity can be determined with the spring stroke and/or the pressure resistance. The detection means, for example a sensor 69, is preferably in operative connection with an adjusting device 70. The adjusting device 70 comprises a parallelogram rod assembly 71 and an actuating means 72, for example a pneumatic cylinder, in the preferred embodiment. The parallelogram rod assembly 71 is mounted on the support body 54 and allows a precise adjustment of the position of the saddling aid 45 within the abdominal cavity of the fish 11. A relative movement of the bearing rails 55, 56 by means of the adjusting device 70 can be realised for the sliding carriage 48.

The pressing element 46 has already been described in connection with FIG. 5. The pressing element 46 according to FIGS. 6 to 8 is in principle and basically constructed comparably. The holding arm 58 is also arranged on the sliding carriage 48 and is moveable with the same in transport direction T and against transport direction T. The pressing shoe 60 is also hinged to and spring-loaded on the free end 59 of the holding arms 58. The holding arm 58 is however also configured moveable relative to the sliding carriage 48 or the support body 54. The holding arm 58 is firstly movable at least in sections in transport direction T of the transport device 15 and against transport direction T of the transport device 15 relative to sliding carriage 48 or the support body 54. The holding arm 58 is for example of a two-part configuration for this and comprises a first holding arm section 58.1, arranged on the fastening element 54. A further holding arm section 58.2, which bears the pressing shoe 60 hinged at its free end 57, is held on the first holding arm section 58.1 and is configured and adapted linear to move relative to the same. The holding arm 58 is quasi telescopically extendable and retractable. The holding arm 58, and more particularly the displaceable holding arm section 58.2, which can for example be configured as a pneumatic cylinder, is allocated to an actuating means 64 for extending and retracting.

In addition to the linear movability of the holding arm 58 by means of the sliding carriages 48 and the linear movability of at least the holding arm section 58.2 bearing the pressing shoe 60 relative to the holding arm section 58.1 arranged on the fastening element 54, the pressing element 46 or the holding arm 58 is mounted to pivot around a pivot axis $S_{A2}$, which is aligned transverse to transport direction T of the transport device 15, is mounted on the sliding carriage 48. In the embodiment shown an actuating means 65 is allocated to the holding arm 58. The actuating means 65 for carrying out the pivot movement of the holding arms 58 relative to the sliding carriage 48 can for example be a pneumatic cylinder or a servo drive or suchlike. The pivot axes $S_{A1}$ of the saddling aid 45 and $S_{A2}$ of the pressing element 46 can be identical, e.g. lie at the same pivot point. The pivot axes $S_{A1}$ and $S_{A2}$ can however also lie offset from each other.

In a particularly preferred embodiment each actuating means 26, 40, 50, 63, 64, 65, 72 and/or each detection means and each sensor 69, 73 is connected with a control and/or regulation device 66. A common control and/or regulation device 66 can optionally be provided. In other embodiments several, or one separate control and/or regulation device 66 are provided for each actuating means 26, 40, 50, 63, 64, 65, 72 and each detection means or each sensor 69, 73, which can for example be brought into, or are in operative connection with each other, for example by means of a superordinate control and/or regulation device 66.

In an advantageous further development of the invention at least one further processing station 13 for processing the beheaded and eviscerated fish 11 is arranged along the transport path in transport direction T of the transport device 15 behind the take-over device 21. Particularly preferably the at least one processing station 13 is a separating device 67 for separating meat from the bone structure of the beheaded and eviscerated fish 11.

As mentioned, the apparatus 10 can be configured and adapted as an independent module. In one embodiment of the invention the apparatus 10 is however an integral part of an apparatus 68 for automatedly obtaining meat from beheaded and eviscerated fish 11. This apparatus 68 for automatedly obtaining meat from beheaded and eviscerated fish comprises a transport device 15 for transporting the beheaded and eviscerated fish 11 tail first and abdominal cavity downwards in transport direction T along a transport path and at least one processing station 13 for automatedly processing the beheaded and eviscerated fish 11. In addition, the apparatus 68 is allocated an apparatus 10 for automatedly saddling beheaded and eviscerated fish 11 on holding apparatuses 11 of the transport device 15, wherein the apparatus 10 for automatedly saddling beheaded and eviscerated fish 11 is arranged in transport direction T upstream of the processing station 13. This apparatus 10, as a component of the processing line, is preferably configured and adapted as disclosed herein. Accordingly, the apparatuses 10 and 68 use the same transport device 15, which guarantees a continuous transport of the saddled fish 11 through the or each processing station 13.

The processing station 13 is optionally a separating device 67, wherein the separating device 67 has at least two rotatingly driveable and controllable circular knives, which are arranged in opposite sides of the transport path for forming a gap S at a distance from each other. Other processing stations, e.g. individual or several, one behind the other, can however also be used.

The method for automatedly saddling beheaded and eviscerated fish 11 on holding apparatuses 12 of a transport device 15 will be described in more detail hereafter with reference to the drawing. The fish are supplied to or fed into the feed device 19 manually or preferably automatically. The beheaded and eviscerated fish 11 are automatically conveyed directly to the transport device 15 by the feed device 19. The beheaded and eviscerated fish are automatically transferred, abdominal cavity first, from the feed device 19 to a catching and centring device 20 by means of the catching and centring device 20, are automatically centred and held, namely parallel to a transport direction T of the transport device 15, and tail first in transport direction T. The beheaded and eviscerated fish 11 centred in the processing middle are automatically taken over from the catching and centring device 20 by means of a take-over device 21 in such a way that the beheaded and eviscerated fish 11 lie in a transfer position on the take-over device 21. The now exactly pre-positioned and aligned beheaded and eviscerated fish 11 are then taken over in a transfer position by the take-over device 21 by means of a holding apparatus 12 of the transport device 15 in the abdominal cavity of each fish 11, wherein the holding apparatus 12 transported in transport direction T pulls the beheaded and eviscerated fish 11 from the take-over device 21. The holding apparatus 12 quasi essentially "crosses" the path of the respective fish 11 located in the transfer position during the rotating transport in transport direction T. The operative connection between holding apparatus 12 and fish 11 created in this way and the same are automatically saddled onto the holding apparatus 12 and transported with the holding apparatus 12 in the direction of a possible processing station 13.

The supply of the beheaded and eviscerated fish 11 by means of the feed device 19 is preferably realised individually and clocked, substantially transverse to their longitudinal expansion to a region of an output position 31 of the catching and centring device 20. The beheaded and eviscerated fish 11 are preferably detected upon arrival in the feed device 19 or during transport in the direction of the output position 31, e.g. during feed to the catching and centring device 20, with regard to their ventral/dorsal position and/or the tail/head position and/or the height or thickness. The detected data and information can preferably be transmitted to the control and/or regulation device 66.

Each beheaded and eviscerated fish 11 advantageously lies substantially parallel to transport direction T, with its tail side first in transport direction T of the transport device, with its head side abutting against a shoulder and its abdominal cavity directed downwards in the output position 31. In other words, each beheaded and eviscerated fish 11 lies in a defined position in the output position 31 and automatically in the catching and centring device 20 in this position. Each fish 11 can fall directly from the feed device 19 into the catching and centring device 20. The automatic transfer preferably takes place only once a release plate 33 has been released. Optionally, fish can also be routed out of the region of the feed device 19 depending on the detected data, so that only correctly aligned and positioned fish 11 of a suitable size lie in the output position 31.

Each beheaded and eviscerated fish 11 is centred and clamped at the tail by the catching and centring device 20 in such a way that the fish middle is centred on the processing middle of processing station 13, in line with the middle of the holding plate 18 of the holding apparatus 12, and the fish 11 is held. The centring can be realised passively or actively. As soon as the centred position is reached the tail of the first fish 11 lying in transport direction T is clamped, wherein clamping can also take place prior to or during centring.

From the centred position each beheaded and eviscerated fish 11 is removed by the take-over device 21 from the centring rails of the catching and centring device 20 and moved into the transfer position, in which each beheaded and eviscerated fish 11 lies on a saddling aid 45 of the take-over device 21 and continues to be held by a tail clamp means 36 of the catching and centring device 20. The take-over device 21 is moved from a waiting position in transport direction T for this and is submersed at least partly, namely with the saddling aid 45, in the abdominal cavity of the beheaded and eviscerated fish 11. During the movement of the saddling aid 45 from the waiting position into a working position within the abdominal cavity the beheaded and eviscerated fish 11 are taken over by the saddling aid 45, so that the beheaded and eviscerated fish 11 lie on the saddling aid 45. Clamping the tail continues to ensure that the beheaded and eviscerated fish 11 will not slide off the saddling aid 45. Optionally the clamping can however also be disconnected earlier.

The saddling aid 45 is directed diagonally downwards in transport direction T and moved into the abdominal cavity and pivoted into a substantially horizontal alignment in a clockwise direction in order to bring the beheaded and eviscerated fish 11 into the final transfer position by means of the saddling aid 45 through transfer to the holding apparatus 12, so that the beheaded and eviscerated fish 11 can be lifted or removed with a clamped tail from the centring rails 37 of the catching and centring device 20. As already described, the tail can be clamped or free during this linear and pivot movement.

The end position of the saddling aid 45 is monitored to protect the beheaded and eviscerated fish 11 against damage, for example through a collision with the saddling aid 45. To put it differently, the end of the abdominal cavity is detected in order to place the saddling aid 45 safely in the abdominal cavity.

As above in connection with the transfer of the beheaded and eviscerated fish 11 the same is lifted by the saddling aid 45 from the centring rails 37 of the catching and centring device 20. In order to safely hold the beheaded and eviscerated fish 11 on the saddling aid 45 after—or even during—take-over from the centring rails 37 of the catching and centring device 20 to the saddling aid 45 of the take-over device 21, a holding force is applied to the back of the beheaded and eviscerated fish 11 by means of a pressing element 46, preferably in transport direction T behind the abdominal cavity of the beheaded and eviscerated fish 11, so that the fish 11 clamped at its tail—or possibly also lying freely on the saddling aid 45—is held between the saddling aid 45 and the pressing element 46. The pressing element 46 is linearly displaced from a waiting position into a holding position for this and possibly also swivelled. The beheaded and eviscerated fish 11 therefore finally comes to lie aligned and positioned in the transfer position.

The fact that the holding apparatuses 12 are driven rotatorily means that these will also repeatedly cross the transfer position. The holding apparatuses 12 will move the transport device 15 into the abdominal cavity of the beheaded and eviscerated fish 11 in such a way that holding plates 18 of the holding apparatuses 12 are moved along between two bearing rails 55, 56 of the saddling aid 45 arranged at a distance from each other, wherein the holding plates 18 protrude at least partly upwards in the direction of the beheaded and eviscerated fish 11, directed above the bearing rails 55, 56 of the saddling aid 45 for recording a central bone of the beheaded and eviscerated fish 11, when the holding plates 18 exit the saddling aid 45 with the holding means 24 in transport direction T at the latest. This means that the holding plates 18 project/protrude upwards above the bearing rails 55, 56 of the saddling aid 45 during transport through the transfer position, so that the holding plate 18 meets the beheaded and eviscerated fish 11 on the inside and at any rate slightly lifts the same from the bearing rails 55, 56. The fact that the beheaded and eviscerated fish 11 is held from above by the pressing element 46 guarantees a safe saddling on the holding apparatus 12. The transport movement of the holding apparatuses 12 in transport direction T will pull the beheaded and eviscerated fish 11 from the saddling aid 45, wherein each beheaded and eviscerated fish 11 is released through opening the tail clamp means 36 when the beheaded and eviscerated fish 11 are taken up by the holding plate 18.

A particularly preferred and ideal automatic saddling will be described in the following with reference to an individual beheaded and eviscerated fish 11. This is automatically transferred to the feed device 19, namely in a receptacle section 25.1 of the receptacle 25 of the feed device 19, if possible abdominal side downwards, tail in transport direction T of the transport device 15. The beheaded and eviscerated fish 11 slides against a flap element 27 of the feed device 19 through the incline of the base body 28 of the feed device 19. The beheaded and eviscerated fish 11 also slides against the shoulder 32 through the diagonal position of the flap elements 27 in relation to the base body 28, quasi against the transport direction T, with its (headless) head side. If the following receptacle section 25.2 is free, the flap element 27 will be opened, so that the beheaded and eviscerated fish 11 slides against the next flap element 27 in the receptacle section 25.2. This will happen until the beheaded and eviscerated fish 11 lies in the receptacle section 25.3 in the output position 31. In the output position the beheaded and eviscerated fish 11 will then lie substantially parallel to transport direction T, with the head side against the shoulder 32. During transport of the beheaded and eviscerated fish 11 this is detected with regard to its ventral/dorsal position, its tail/head position and its height or thickness. For the case of incorrect positioning or an unsuitable height or thickness the beheaded and eviscerated fish 11 will be automatically separated out, at least in the output position 31, but preferably in the receptacle section 25.2, through opening a floor plate 30. The flap elements 27 and the floor plate 30 are activated by the control and/or regulation device 66. For the case that the beheaded and eviscerated fish 11 are detected as suitable and correctly aligned the release plate 33 will be activated by the control and/or regulation device 66, so that the beheaded and eviscerated fish 11 falls downwards into the catching and centring device 20.

The beheaded and eviscerated fish 11 falls with the abdominal side first from the centring rails 37 of the catching and centring device 20. For a central alignment the centring rails 37, activated by the control and/or regulation device 66, can be swivelled around the pivot axes $S_{Z1}$ and $S_{Z2}$. As soon as centring is complete the tail clamp means 36 is closed in that the clamp jowls 43, activated by the control and/or regulation device 66, pivot around the pivot axes SK. The clamping of the tail can however also occur simultaneously with the centring. During this holding and centring process the take-over device 21 is still in a waiting position, as it is for example illustrated in FIG. 6.

As soon as the beheaded and eviscerated fish 11 is held and centred in the catching and centring unit 20 the take-over apparatus 21 is moved from the waiting position in transport direction T (see for example FIG. 7), namely activated by the control and/or regulation device 66. The movement along the linear guide 49 will bring the saddling aid 45 as well as the pressing element 46 in transport direction T into a working position together with the sliding carriage 48. The saddling aid 45 is submersed in the abdominal cavity of the beheaded and eviscerated fish 11 for this, whilst the pressing element 46 is moved along externally above the back. In addition to the linear movement along the linear guide 49 the saddling aid 45, activated by the control and/or regulation device 66, is moved on depending on the size of the fish 11 or the abdominal cavity and relative to the sliding carriage 48 in transport direction T. The saddling aid 45 is initially swivelled slightly into a position falling away from transport direction T around the pivot axis $S_{A1}$, activated by the control and/or regulation device 66. As soon as a defined or predetermined end point of the saddling aid 45 is reached in the abdominal cavity all linear movements stop. At this point—or during the linear movement in the direction of the end point—the saddling aid 45 is swivelled in a clockwise direction around the pivot axis $S_{A1}$ to the saddling aid 45, so that the beheaded and eviscerated fish 11 stands in the substantially horizontal transfer position.

Parallel to or following this—in any case before the holding apparatus 12 for take-over of the beheaded and eviscerated fish 11 moves into the transfer position and comes into contact with the beheaded and eviscerated fish 11 from below/inside—the pressing element 46 is swivelled from the waiting position around pivot axis $S_{A2}$, activated by the control and/or regulation device 66, into the holding position, in which the pressing shoe 60 lies on the back of the beheaded and eviscerated fish 11. The beheaded and eviscerated fish 11 is therefore held in a sandwich-like way between the saddling aid 45 and the pressing element 46 in the transfer position.

The holding apparatus 12 is submersed in the abdominal cavity and between the bearing rails 55, 56 of the saddling aid 45 with its holding plate 18. The holding plate 18 protrudes above the bearing rails 55, 56, at least with its holding means 24, and makes contact with the middle bone of the inside of the beheaded and eviscerated fish 11. The pressing element 46 prevents that the beheaded and eviscerated fish 11 escapes upwards. As soon as contact is made between the holding means 24 of the holding plate 18 and the beheaded and eviscerated fish 11 the holding apparatus 12 transported in transport direction T pulls the beheaded and eviscerated fish 11 from the saddling aid 45, which is why the tail clamp means 36 is opened then, at the latest, activated by the control and/or regulation device 66.

Once the beheaded and eviscerated fish 11 has been automatically saddled completely onto the holding apparatus 12, e.g. is finally transferred, the take-over device 21 is moved back into its starting position, so that a next beheaded and eviscerated fish 11 can fall into the catching and centring device 20.

The automatic saddling of the beheaded and eviscerated fish 11 was described above. The method for automatedly obtaining meat from beheaded and eviscerated fish 11, which follows the actual saddling process, will be described in the following. For the automatic obtaining of meat, e.g. in particular when obtaining/harvesting the filets from the bone structure, the beheaded and eviscerated fish 11 are saddled with the abdominal cavity downwards on holding apparatuses 12 of a transport apparatus 15. By means of a transport apparatus 15 comprising at least one holding apparatus 12 the beheaded and eviscerated fish 11 are transported along a transport path tail first in transport direction T. At least one processing station 13 is arranged along a transport path, by means of which the meat is separated from the bone structure of the beheaded and eviscerated fish 11.

According to the invention the beheaded and eviscerated fish 11 are automatically saddled onto the holding apparatuses 12. The automatic saddling of the beheaded and eviscerated fish 11 is particularly preferably carried out on the holding apparatuses 12 with an apparatus 10, 68 as disclosed herein.

The entire method is preferably adapted and controlled and/or regulated with a common control and/or regulation device 66, for which the control and/or regulation device 66 can also be connected with a storage and/or processing module such as for example a personal computer (PC) or suchlike.

The invention claimed is:

1. An apparatus configured and adapted for automatedly saddling beheaded and eviscerated fish on holding apparatuses for automated further processing of the beheaded and eviscerated fish at a downstream processing station, the apparatus comprising:
   a frame structure;
   a transport device arranged on the frame structure, configured and adapted for transporting beheaded and eviscerated fish tail first and abdominal cavity downwards in a transport direction T along a transport path, wherein the transport device comprises:
   a transport unit that is driven rotatingly, and
   at least one holding apparatus fitted on the transport unit, the at least one holding apparatus comprising at least one fastening element and a holding plate which is configured and adapted for holding the beheaded and eviscerated fish during processing;
   a feed device configured and adapted for the automated feed of the beheaded and eviscerated fish into a region of the transport device;
   a catching and centring device configured and adapted to catch the beheaded and eviscerated fish released by the feed device, with the abdominal cavity facing downwards, and centring the same parallel to the transport direction T; and
   a take-over device configured and adapted for taking over the beheaded and eviscerated fish from the catching and centring device, for holding the beheaded and eviscerated fish in a transfer position, and for releasing the beheaded and eviscerated fish as soon as the at least one holding apparatus transported through the beheaded and eviscerated fish in a region of the abdominal cavity captures the beheaded and eviscerated fish and pulls them in the transfer position from the take-over device.

2. The apparatus of claim 1, wherein the feed device comprises a cascade-like receptacle for receiving at least two beheaded and eviscerated fish, wherein receptacle sections of the receptacle configured for individually receiving the beheaded and eviscerated fish are separated from each other by actuating flap elements to be opened and closed by an actuating means.

3. The apparatus of claim 2, wherein the flap elements are controllably configured and adapted for an individual and clocked output of the beheaded and eviscerated fish substantially transverse to a longitudinal expansion of the beheaded and eviscerated fish from a first receptacle section to a following receptacle section up to a region of an output position on the catching and centring device.

4. The apparatus of claim 2, wherein the feed device comprises detection means at least for detecting a ventral/dorsal position and/or a tail/head position and/or a height or a thickness of the beheaded and eviscerated fish.

5. The apparatus of claim 1, wherein the catching and centring device is arranged below the feed device in a region of an output position of the feed device in such a way that the beheaded and eviscerated fish can be moved from the feed device, with the abdominal cavity first and the tail in transport direction T of the transport device, into the catching and centring device.

6. The apparatus of claim 5, wherein at least one release flap is arranged in the region of the output position in a transition from the feed device to the catching and centring device and is allocated to the feed device and/or the catching and centring device.

7. The apparatus of claim 1, wherein the catching and centring device comprises a support body arranged on the frame structure, and wherein a holding and centring means and a tail clamp means are allocated to the catching and centring device.

8. The apparatus of claim 7, wherein the holding and centring means comprises at least two centring rails arranged at a distance from each other and aligned substantially parallel to the transport direction T, forming a centring shaft, wherein the centring rails are configured and adapted for changing the distance of at least some sections of the centring rails that can be moved towards and away from each other.

9. The apparatus of claim 8, wherein the centring rails are moveably configured optionally separately or together by pneumatic cylinders or servo drives as actuating means.

10. The apparatus of claim 7, wherein the centring rails are mounted on the support body to pivot around pivot axes SZ1 and SZ2, which are aligned parallel to the transport direction T of the transport device.

11. The apparatus of claim 6, wherein the tail clamp means comprises at least two clamp jowls that can be moved towards and away from each other, wherein the at least two clamp jowls are arranged in the transport direction T at the output side end of the catching and centring device to be able to clamp the tail of the first incoming fish.

12. The apparatus of claim 11, wherein the clamp jowls are optionally configured separately or together by pneumatic cylinders or servo drives or suchlike as actuating means.

13. The apparatus of claim 11, wherein the clamp jowls are mounted on the support body to pivot around a pivot axis SK aligned parallel to the transport direction T.

14. The apparatus of claim 1, wherein the take-over device comprises a saddling aid and a pressing element, wherein a unit is formed from the saddling aid and the pressing element and is moveably configured.

15. The apparatus of claim 14, wherein the unit formed from the saddling aid and the pressing element comprises a moveable sliding carriage to which the saddling aid and the pressing element are allocated, wherein the sliding carriage is moveably configured and adapted relative to the transport device.

16. The apparatus of claim 15, wherein the take-over device further comprises a linear guide and a drive means as actuating means by which the sliding carriage bearing the saddling aid and the pressing element is configured to move back and forth in the transport direction T of the transport device and against the transport direction T of the transport device.

17. The apparatus of claim 16, wherein the drive means is a slider-crank mechanism comprising a crank arm which is in operative connection with the sliding carriage bearing the saddling aid and the pressing element via a thrust rod.

18. The apparatus of claim 14, wherein the saddling aid comprises two bearing rails aligned substantially parallel to the transport direction T of the transport device which are arranged at a distance from each other for forming a gap, wherein the distance of the bearing rails is at least as great as a width of the holding plate of the holding apparatus submersed in the gap during transport of the holding apparatus.

19. The apparatus of claim 14, wherein the saddling aid is mounted and moveably configured relative to the sliding carriage by pneumatic cylinders or servo drives as actuating means.

20. The apparatus of claim 14, wherein the saddling aid is mounted on the sliding carriage to pivot around a pivot axis SA1, wherein the saddling aid is mounted transverse to the transport direction T of the transport device.

21. The apparatus of claim 14, wherein the pressing element comprises a holding arm and a pressing shoe arranged at a free end of the holding arm.

22. The apparatus of claim 21, wherein the pressing shoe is hinged to and spring-loaded on the holding arm (58).

23. The apparatus of claim 21, wherein the holding arm is moveably configured at least in some sections in the transport direction T of the transport device and against the transport direction T of the transport device relative to the sliding carriage.

24. The apparatus of claim 23, wherein the holding arm is configured telescopically by a pneumatic cylinder as actuating means, to be extended and retracted.

25. The apparatus of claim 21, wherein either of the pressing element or the holding arm is mounted to pivot around a pivot axis SA2, which is aligned transverse to the transport direction T of the transport device, and is mounted on the sliding carriage.

26. The apparatus of claim 25, wherein the pressing element is allocated a pneumatic cylinder or a servo drive as actuating means for carrying out a pivot movement relative to the sliding carriage.

27. The apparatus of claim 1, further comprising at least one actuating means and at least one detection means, wherein each actuating means and/or each detection means is connected with a control and/or regulation device.

28. The apparatus of claim 1, wherein at least one further processing station for processing the beheaded and eviscerated fish is arranged along the transport path in the transport direction T of the transport device behind the take-over device.

29. The apparatus of claim 28, wherein the at least one processing station is a separating device for separating meat from a bone structure of the beheaded and eviscerated fish.

30. An apparatus for automatedly obtaining meat from beheaded and eviscerated fish, the apparatus comprising:
a transport device for transporting the beheaded and eviscerated fish tail first and abdominal cavity downwards in a transport direction T along a transport path; and
at least one processing station for automatedly processing the beheaded and eviscerated fish, wherein:

the apparatus further comprises an apparatus for automatedly saddling beheaded and eviscerated fish on a holding apparatus of the transport device, and the apparatus for automatedly saddling beheaded and eviscerated fish is arranged in the transport direction T before the processing station;

wherein the apparatus for automatedly saddling beheaded and eviscerated fish on the holding apparatus of the transport device comprises:

a frame structure;

the transport device being arranged on the frame structure, configured and adapted for transporting beheaded and eviscerated fish tail first and abdominal cavity downwards in the transport direction T along the transport path, wherein the transport device comprises:

a transport unit that is driven rotatingly, and at least one holding apparatus fitted on the transport unit, the at least one holding apparatus comprising at least one fastening element and a holding plate which is configured and adapted for holding the beheaded and eviscerated fish during processing;

a feed device configured and adapted for the automated feed of the beheaded and eviscerated fish into a region of the transport device;

a catching and centring device configured and adapted to catch the beheaded and eviscerated fish released by the feed device, with the abdominal cavity facing downwards, and centring the same parallel to the transport direction T; and a take-over device configured and adapted for taking over the beheaded and eviscerated fish from the catching and centring device, for holding the beheaded and eviscerated fish in a transfer position, and for releasing the beheaded and eviscerated fish as soon as a holding apparatus transported through the beheaded and eviscerated fish in a region of the abdominal cavity captures the beheaded and eviscerated fish and pulls them in the transfer position from the take-over device.

31. The apparatus of claim 30, wherein the apparatus for automatedly saddling beheaded and eviscerated fish is an integral part of the apparatus for automatedly obtaining meat from beheaded and eviscerated fish, with a common transport device for transporting the beheaded and eviscerated fish in the transport direction T tail first and abdominal cavity downwards.

32. The apparatus of claim 30, wherein the processing station comprises a separating device, wherein the separating device has at least two rotatingly driveable and controllable circular knives, which are arranged on opposite sides of the transport path at a distance from each other, the distance forming a gap S.

33. A method for automatedly obtaining meat from beheaded and eviscerated fish, the method comprising:

saddling the beheaded and eviscerated fish with an abdominal cavity of the beheaded and eviscerated fish downwards on holding apparatuses of a transport device;

transporting the beheaded and eviscerated fish by means of the transport device along a transport path tail first in a transport direction T; and separating the meat from a bone structure of the beheaded and eviscerated fish by means of a processing station arranged along the transport path;

wherein the beheaded and eviscerated fish are automatically saddled on the holding apparatuses;

wherein the saddling of the beheaded and eviscerated fish on the holding apparatuses is carried out with an apparatus configured and adapted for automatedly saddling beheaded and eviscerated fish on holding apparatuses for automated further processing of the beheaded and eviscerated fish, the apparatus comprising:

a frame structure;

the transport device arranged on the frame structure, configured and adapted for transporting beheaded and eviscerated fish tail first and abdominal cavity downwards in a transport direction T along a transport path, wherein the transport device comprises:

a transport unit that is driven rotatingly, and at least one holding apparatus fitted on the transport unit, the at least one holding apparatus comprising at least one fastening element and a holding plate which is configured and adapted for holding the beheaded and eviscerated fish during processing;

a feed device configured and adapted for the automated feed of the beheaded and eviscerated fish into a region of the transport device;

a catching and centring device configured and adapted to catch the beheaded and eviscerated fish released by the feed device, with the abdominal cavity facing downwards, and centring the same parallel to the transport direction T; and a take-over device configured and adapted for taking over the beheaded and eviscerated fish from the catching and centring device, for holding the beheaded and eviscerated fish in a transfer position, and for releasing the beheaded and eviscerated fish as soon as the at least one holding apparatus transported through the beheaded and eviscerated fish in a region of the abdominal cavity captures the beheaded and eviscerated fish and pulls them in the transfer position from the take-over device.

34. The method of claim 33, wherein the method for automatedly saddling beheaded and eviscerated fish comprises:

automatically feeding each beheaded and eviscerated fish by means of the feed device directly to the transport device;

automatically transferring each beheaded and eviscerated fish abdominal cavity first from the feed device to the catching and centring device;

automatically centring and holding each beheaded and eviscerated fish parallel to the transport direction T of the transport device and tail first in the transport direction T by means of the catching and centring device;

automatically taking over each beheaded and eviscerated fish from the catching and centring device by means of the take-over device in such a way that the beheaded and eviscerated fish lies in the transfer position on the take-over device; and automatically removing each beheaded and eviscerated fish in the transfer position from the take-over device by means of the at least one of the holding apparatuses of the transport device conveyed into the abdominal cavity of each beheaded and eviscerated fish, wherein the holding apparatus transported in the transport direction T pulls the beheaded and eviscerated fish off of the take-over device.

* * * * *